US011470090B2

(12) United States Patent
Han et al.

(10) Patent No.: US 11,470,090 B2
(45) Date of Patent: Oct. 11, 2022

(54) DYNAMICALLY-TIERED AUTHENTICATION

(71) Applicant: LendingClub Corporation, San Francisco, CA (US)

(72) Inventors: Hyunsuk Han, San Ramon, CA (US); Saverio Sgro, Mountain View, CA (US)

(73) Assignee: LendingClub Bank, National Association, Lehi, UT (US)

( * ) Notice: Subject to any disclaimer, the term of this patent is extended or adjusted under 35 U.S.C. 154(b) by 167 days.

(21) Appl. No.: 16/836,814

(22) Filed: Mar. 31, 2020

(65) Prior Publication Data

US 2021/0306344 A1 Sep. 30, 2021

(51) Int. Cl.
*H04L 29/06* (2006.01)
*H04L 9/40* (2022.01)

(52) U.S. Cl.
CPC .......... *H04L 63/105* (2013.01); *H04L 63/083* (2013.01); *H04L 63/108* (2013.01)

(58) Field of Classification Search
CPC ... H04L 63/105; H04L 63/083; H04L 63/108; H04L 63/08
USPC .......................................................... 726/6
See application file for complete search history.

(56) References Cited

U.S. PATENT DOCUMENTS

| | | | |
|---|---|---|---|
| 8,006,289 | B2 | 8/2011 | Hinton |
| 9,300,645 | B1 * | 3/2016 | Rao ..................... G06F 3/04886 |
| 9,800,614 | B2 | 10/2017 | Hinton |
| 10,860,703 | B1 | 12/2020 | Manwiller |
| 11,288,346 | B1 | 3/2022 | Zubovsky et al. |
| 2002/0087894 | A1 | 7/2002 | Foley et al. |
| 2008/0134305 | A1 * | 6/2008 | Hinton .................... H04L 63/08 726/5 |
| 2008/0313728 | A1 | 12/2008 | Pandrangi |
| 2009/0106433 | A1 | 4/2009 | Knouse |
| 2009/0292927 | A1 | 11/2009 | Wenzel |

(Continued)

OTHER PUBLICATIONS

On applying SIP security to networked appliances, Chan et al., Jan. 2002 (Year: 2002).*

(Continued)

*Primary Examiner* — Jahangir Kabir
(74) *Attorney, Agent, or Firm* — Hickman Becker Bingham Ledesma LLP

(57) ABSTRACT

Techniques are described herein for dynamically-tiered authentication, which allows the authentication tier (AT) associated with a session to be automatically downgraded based on the session satisfying one or more downgrade criteria. Automatically downgrading a session eliminates some authentication-based privileges for the session without eliminating all privileges for the session. A session satisfies downgrade criteria based on: an explicit request for session downgrading; client interaction with the application; and/or activity on the device on which the client runs. For example, if a client authenticates to a third AT, but only performs actions in the application that are associated with the first AT during a pre-defined amount of time, the AT associated with the session is automatically downgraded. The session is either downgraded from the third AT to the first AT, or downgraded in intervals until the current or more recently accessed tiers are consistent with the current AT of the session.

22 Claims, 12 Drawing Sheets

(56) References Cited

U.S. PATENT DOCUMENTS

| | | | |
|---|---|---|---|
| 2010/0107214 A1 | 4/2010 | Ganz | |
| 2013/0160144 A1 | 6/2013 | Mok et al. | |
| 2013/0298047 A1 | 11/2013 | Buehler | |
| 2014/0109196 A1* | 4/2014 | Jagannatharao | H04L 63/10 726/4 |
| 2015/0227725 A1 | 8/2015 | Grigg et al. | |
| 2017/0118223 A1* | 4/2017 | Mathew | G06F 21/31 |
| 2019/0334921 A1* | 10/2019 | Pattar | H04L 63/0861 |
| 2020/0320218 A1 | 10/2020 | Buehler et al. | |
| 2021/0234850 A1 | 7/2021 | Vogt | |
| 2021/0306334 A1 | 9/2021 | Han et al. | |
| 2021/0306346 A1 | 9/2021 | Han et al. | |
| 2021/0350388 A1 | 11/2021 | Brannon et al. | |

OTHER PUBLICATIONS

USPTO.Gov, "Patent Electronic System Access Document", www.uspto.gov/sites/default/files/documents/Patent%20Electronic%20System%20Access%20Document, dated Oct. 2018, 9 pages.

United States Patent and Trademark Office, "Authentication Change for EFS-Web and PA", https://www.uspto.gov/patent/authentication-changes-efs-web-and-pair, dated Nov. 20, 2018, 2 pages.

Coinbase.com, "Coinbase User Agreement", https://www.coinbase.com/legal/user_agreement dated as early as Jan. 2020, 23 pages.

Nordicapis.com, "GraphQL or Bust", Nordic APIs, dated Jul. 11, 2018, 125 pages.

Han, U.S. Appl. No. 16/836,813, filed Mar. 31, 2020, Non-Final Rejection, dated Jan. 21, 2022.

Shweta et al., "Three Tier Web Application and Internal Database Protection by Double Guard", IJSTE, vol. 2, Issue 10, Apr. 2016, 11 pages.

Kaleem et al., "A Customizable Client Authentication Framework (CCAF) Based on Multi-Factor for Cloud Computing Application", IJCST, vol. 8, Issue 3, May 2017, 8 pages.

Han, U.S. Appl. No. 17/139,793, filed Dec. 31, 2020, Notice of Allowance and Fees Due, dated Aug. 1, 2022.

Han, U.S. Appl. No. 17/139,793, filed Dec. 31, 2020, Notice of Allowance and Fees Due, dated Jul. 12, 2022.

Han, U.S. Appl. No. 16/836,813, filed Mar. 31, 2020, Notice of Allowance and Fees Due, dated Jul. 14, 2022.

Han, U.S. Appl. No. 16/836,813, filed Mar. 31, 2020, Notice of Allowance and Fees Due, dated Jun. 29, 2022.

* cited by examiner

DYNAMICALLY-TIERED AUTHENTICATION

This application is related to the following applications, the entire contents of each of which is hereby incorporated by reference as if fully set forth herein:

U.S. application Ser. No. 16/836,813, inventors Hyunsuk Han, et al., titled "Conditionally-Deferred Authentication Steps For Tiered Authentication", filed Mar. 31, 2020; and U.S. Prov. Appln. No. 63/003,207, inventors Hyunsuk Han, et al., titled "Secure Content Management Through Authentication", filed Mar. 31, 2020.

FIELD OF THE INVENTION

The present invention relates to protecting sensitive information for authentication-based applications, and, more specifically, to downgrading the authentication level of a given client session while maintaining at least some authentication-based privileges for the client session.

BACKGROUND

Many applications, including applications for banking, shopping, government, etc., utilize sensitive information that is personally-identifying for users (PII). Examples of PII include full name, social security number, place of birth, birth date, mother's maiden name, email, phone number, physical address, etc. To protect such information, applications generally require user authentication via a username and password prior to allowing a user to navigate application content. Many times, additional authentication steps (AAS), such as knowledge-based authentication (KBA) or multi-factor authentication (MFA) in addition to username/password login, are also required in order to perform restricted actions, such as viewing or editing PII. Requirement of AAS before allowing a user to access an application works to prevent cyber-attacks, such as credential stuffing attacks that use known combinations of usernames and passwords to get unauthorized access to authentication-based applications.

KBA requires correct responses to one or more questions that require knowledge that would normally be held by the user, such as questions involving PII, credit bureau data, addresses that have been associated with the user, etc. MFA adds one or more additional factors, or evidence of identity, to user authentication. For example, an additional factor used for MFA may be a onetime password (OTP) that is sent to an email or telephone number associated with the user, use of a magic link (i.e., passwordless authentication), requests for biometric authentication (such as fingerprint, face ID, retina scan), etc.

Generally, a request for AAS, also referred to as an AAS challenge, is issued after the user has logged into an application by providing a username and password, or in conjunction with the user logging into the application. As such, an AAS challenge creates an extra hurdle for users to enter and navigate the application. This additional hurdle generally decreases click-through and conversion rates, which reduces the likelihood of the application enlisting the user for the application. The decrease in user interest in an application because of extra hurdles to application navigation can have significant financial impact on entities that offer services or products via the application, or on entities that make revenue based on click-throughs and conversions via the application.

To increase the attractiveness of authentication-based applications, it would be desirable to remove or delay AAS challenges as much as possible. One way to reduce the required AAS for an application is to allow a user to waive AAS requirements, either in general or when requests originate from a trusted device. However, waiving AAS requirements produces a vulnerability in application security, which may leave the user's PII open for attack.

Delayed, rather than waived, AAS avoids introduction of vulnerability to application security, but it can be expensive to retrofit an established application to delay AAS. For example, delayed AAS may be based on tracking the AAS requirements of different restricted pages in an application using intermediate status flags for login requests. However, retrofitting a system to handle the new status flags can be very costly.

Accordingly, it would be beneficial to allow existing applications to delay AAS challenges as much as possible without requiring costly modifications to the application system.

Furthermore, even when authentication is required for client session establishment, authenticated client sessions are generally at risk of being attacked. For example, while a user is fully authenticated to an online bank application from a personal laptop, the user leaves the laptop unattended (for even a short amount of time). During the period of inattention, anyone could use the authenticated client session to steal or manipulate data on the client account.

Some applications mitigate the risk of attack on authenticated user sessions by having relatively short session expiry, e.g., logging a client out of the application when there is a short period of client inactivity. While shortened sessions mitigate the possibility of account takeover or data breach, the short session times may lead to poor user experience given that users may be unintentionally logged out of a session because of brief inactivity. Poor user experience can result in significant financial impact on certain business models.

Thus, it would be beneficial to mitigate the risk of data breach post-authentication without risking poor user experience by logging users out of authenticated sessions after brief periods of inactivity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
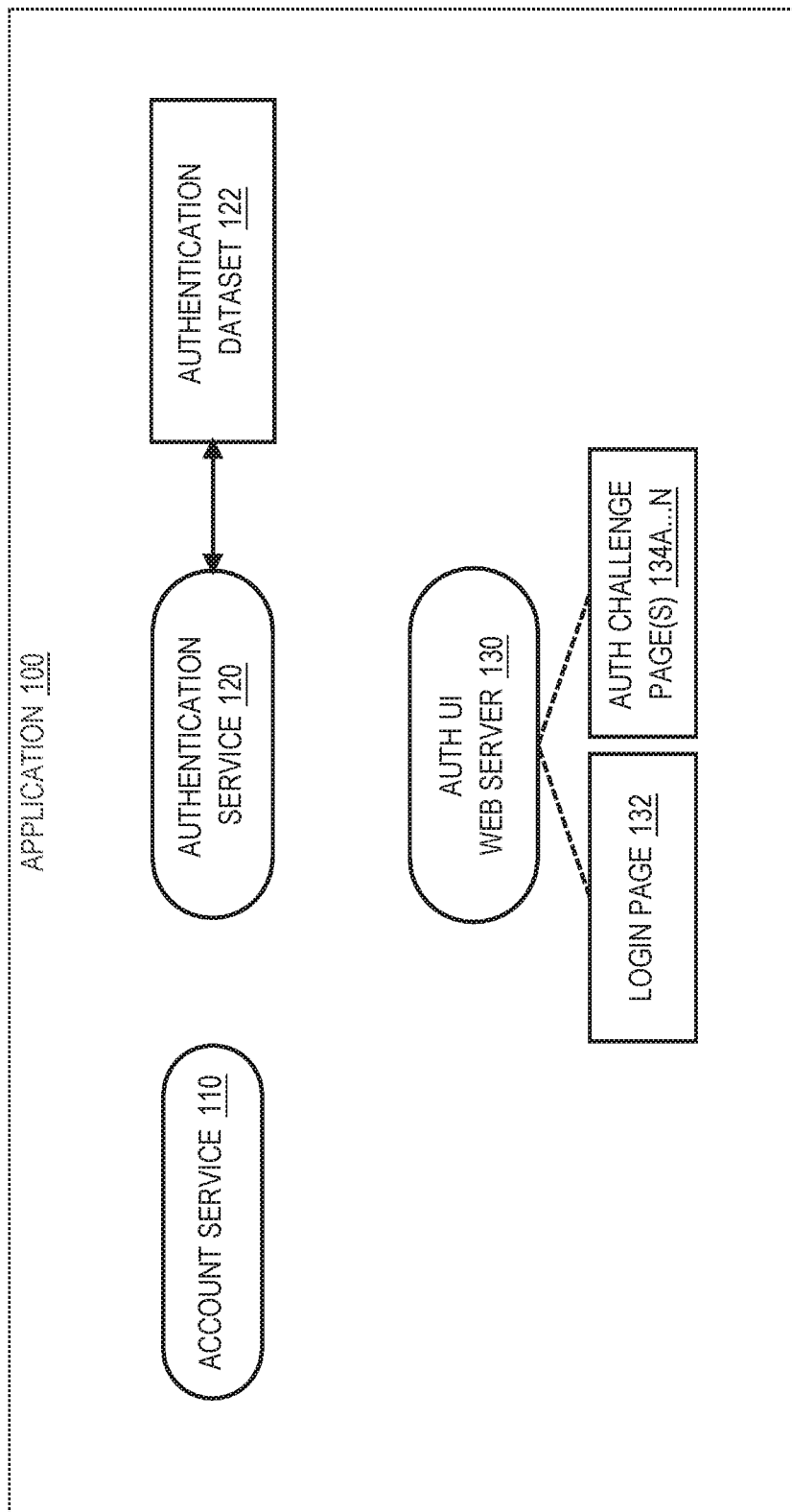
FIG. 1 depicts an example application with an example configuration of services that perform functions for the application.

In the following description, for the purposes of explanation, numerous specific details are set forth in order to provide a thorough understanding of the described techniques. It will be apparent, however, that the described techniques may be practiced without these specific details. In other instances, well-known structures and devices are shown in block diagram form in order to avoid unnecessarily obscuring the described techniques.

General Overview

According to an embodiment, special session identifiers are used to defer additional authentication steps (AAS) for at least some restricted actions (such as viewing or editing PII) in a given application, where one or more authentication steps are required in order to perform the restricted actions. Specifically, for a given application, authentication steps are organized into a plurality of authentication tiers (organized as a hierarchy that goes from a lowest-security tier to a highest-security tier, unless otherwise specified), where each authentication tier is associated with one or more authentication steps required to perform restricted actions in the application. Furthermore, restricted actions are associated (either explicitly or implicitly) with one of the plurality of authentication tiers.

According to an embodiment, when a client satisfies the requirements of one or more authentication steps for the application during a given client session, a special session identifier is generated for the client session. The special session identifier is associated with both a normal session identifier for the client session and the authentication tier achieved for the session based on the satisfied authentication steps. This special session identifier is sent with future communications for the client session, including requests for restricted actions. Using the special session identifier associated with requests for restricted actions, authentication steps that are associated with authentication tiers that are higher-security than the authentication tier currently associated with the special session identifier are deferred until a request for a restricted action that is associated with a higher-security authentication tier is requested. Thus, a restricted action that qualifies for AAS deferral (AASD) is an action that is associated with an authentication tier that is at or lower than the authentication tier associated with the special session identifier.

Web servers that are enabled for AASD send context information, which identifies the requested action, to an authentication service that is tasked to (a) verify validity of client sessions and also (b) verify proper client authentication for restricted client requests. Specifically, the authentication service verifies whether an associated session is valid in connection with every client request, where a valid session is a session that is currently-established and not expired. Thus, in general, the authentication service responds to a client request with a message indicating that the session is invalid if there is no session identifier accompanying the request, if the session identifier accompanying the request is not found in session identifier records for the application, or if the session has become invalid based on timeout or based on the client logging out of the session.

However, according to an embodiment, an invalid session message is used (even when the session is valid) to signal that further authentication steps are required to perform the requested restricted action. Thus, according to an embodiment, the authentication service only validates a session associated with a request for a restricted action when the service determines, based on the special session identifier, that the client has at least reached the authentication tier required by the requested action identified in the context information. In this case, the requested action is eligible for AASD, and the restricted action is performed without requiring AAS to be satisfied by the client.

The authentication service determines that AAS is required to perform a requested restricted action when (a) the authentication tier associated with the restricted action is a higher-security tier than the authentication tier associated with the client session, or (b) the client session is associated with an authentication tier that is lower than the highest-security authentication tier and there is no context information accompanying the request for session validation, in which case the authentication service assumes that the highest-security authentication tier is required to perform the request. The presence of option (b) allows the system to work with web servers, in the application system, that are not configured with functionality required to implement AASD. As such, AASD may be implemented in an application system without having to retrofit all web servers with AASD functionality. In fact, web servers that are not AASD-enabled utilize special session identifiers as if they were normal session identifiers.

When the authentication service determines that AAS is required to perform a requested restricted action that is associated with a valid client session, the authentication service indicates that the session is invalid. This invalid session message issued for a valid client session initiates the process of serving, to the client, one or more authentication challenges for the AAS required to perform the requested action. In this way, use of an invalid session message for a valid client session, when non-AASD-enabled web servers would expect a valid session message, causes a web server (including non-AASD-enabled web servers) to initiate the process of re-authenticating the client session. Specifically, receiving the invalid session message causes the requesting web server to redirect the client to an authentication user interface ("auth UI") web server, which is AASD-enabled. The auth UI server also requests session validation from the authentication service, where the request indicates that the auth UI server is the source of the validation request.

At this point, if the authentication service indicates to the auth UI server that the client session is invalid, then the auth UI server serves a login page to the client. However, if the session is valid, then, based on the context information identifying the auth UI server, the authentication service provides, to the auth UI server, an indication that the client session is valid. This valid session message includes metadata that specifies the one or more needed AAS for the requested action. Based on the metadata, and the auth UI server serves, to the client, one or more authentication challenge pages associated with the needed AAS. In this way, the client is asked to satisfy AAS associated with the requested restricted action without being required to repeat already-satisfied authentication step requirements, and without being required to satisfy AAS that is associated with any authentication tiers that are higher-security than the authentication tier for the requested restricted action.

Furthermore, according to one or more embodiments, dynamically-tiered authentication allows the authentication tier associated with a given client session to be automatically downgraded based on the client session satisfying one or more downgrade criteria. Automatically downgrading a client session eliminates some authentication-based privileges for the client session without eliminating all authentication-based privileges for the client session. A client session satisfies downgrade criteria based on an explicit request for session downgrading, client interaction with the application, and/or activity on the device on which the client runs. For example, if a client authenticates to a third authentication tier, but only performs actions in the application that are associated with the first authentication tier during a pre-defined amount of time, the authentication tier associated with the client session is automatically downgraded. According to an embodiment, the client session is downgraded from the third authentication tier to the first authentication tier. According to another embodiment, the client session is downgraded in intervals until the current or more recently accessed tiers are consistent with the current authentication tier of the client session.

Downgrading the authentication tier associated with a client session based on downgrade criteria provides protection for the sensitive information and/or actions available at higher authentication tiers while providing the client with the level of access that appears to be needed at the time. Further, by downgrading the authentication tier of a client session rather than logging the client out of the system or invalidating the client session, a user is spared the inconvenience of being inadvertently logged out of the session and being required to provide log in credentials in order to regain access to the application.

System Implementing an Application with Authentication Tiers

FIG. 1 depicts an example application 100 with an example configuration of services that perform functions for the application. Specifically, in FIG. 1, application 100 includes an account service 110, an authentication service ("auth service") 120 that has access to an authentication dataset 122, and one or more web servers including an AASD-enabled authentication user interface web server ("auth UI server") 130 that serves a login page 132 and one or more authentication challenge pages 134A-N. For purposes of illustration, application 100 includes one or more other web servers (not depicted in FIG. 1), serving one or more respective pages. The one or more other web servers may or may not be AASD-enabled, and may or may not be in the same web domain as application 100.

According to one or more embodiments, AASD functionality is implemented using middleware, which is logic, for a web server, that allows the web server to perform one or more middleware-library functions. In this embodiment, one or more particular middleware-library functions facilitate AASD functionality, such as functionality to include context information in a request to validate a client session. A first web server that uses the same version of middleware as a second web server has access to the same middleware-library functions as the first web server. A web server that uses a different version of middleware has access to different middleware-library functions, or different versions of the same middleware-library functions, than the first and second web server. A web server that does not implement middleware does not have access to any middleware-library functions. In this embodiment, if a web server implements a version of middleware with AASD middleware-library functions, the web server may implement AASD techniques described herein, and otherwise the web server reverts to non-AASD authentication for a given web page. Nevertheless, AASD techniques may be implemented in any way, including embedding AASD functions in web servers without use of middleware, etc.

Figure 2:
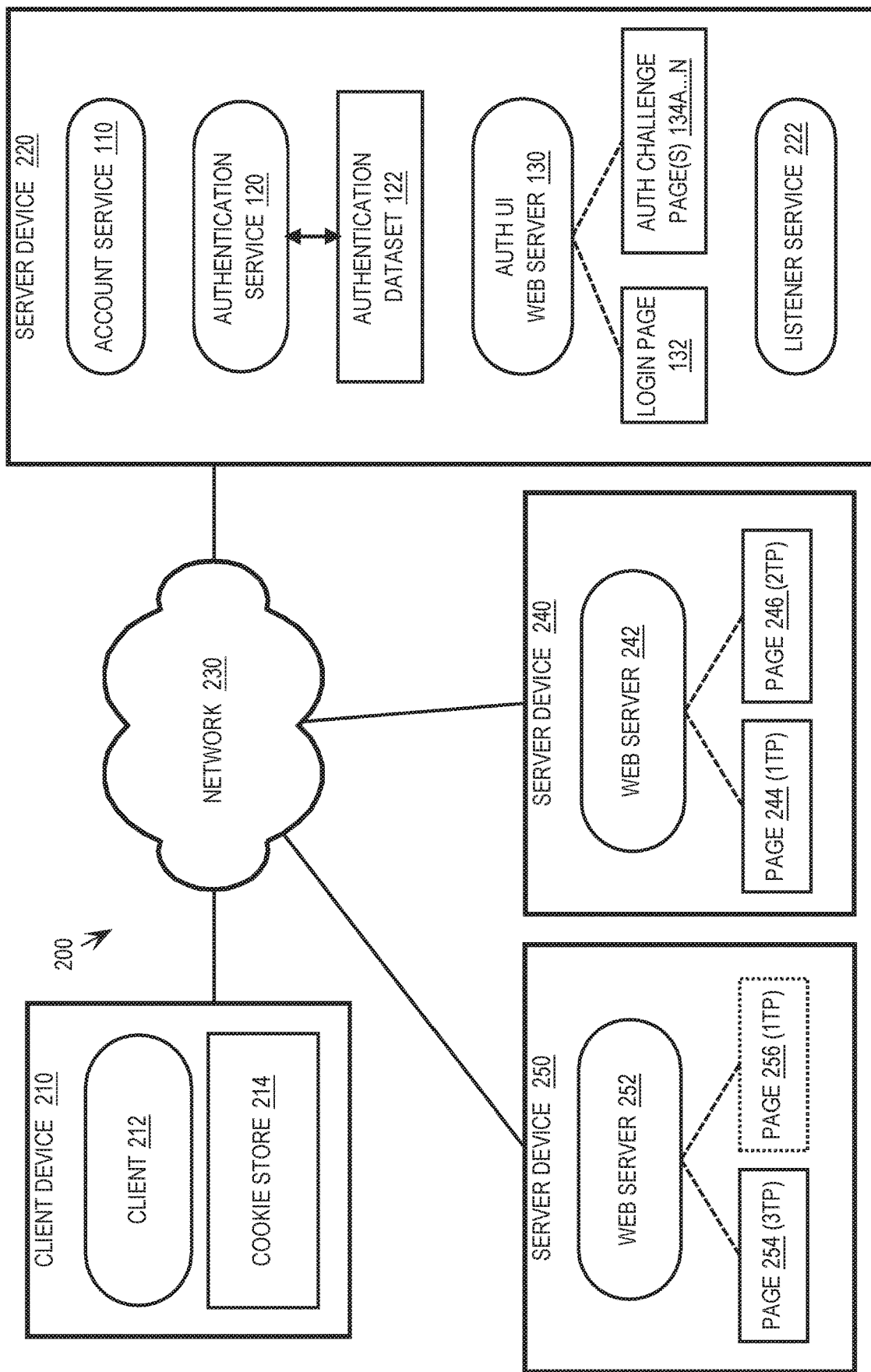
FIG. 2 is a block diagram that depicts an example network arrangement for implementing an application.

FIG. 2 is a block diagram that depicts an example network arrangement 200 for implementing application 100, according to one or more embodiments. Specifically, network arrangement 200 includes a client device 210 and server devices 220, 240, and 250, communicatively coupled via a network 230. Client device 210 runs a client 212, which is configured to communicate with one or more server devices over network 230. Client 212 may be implemented in any way, including as a desktop browser-based client, a mobile browser-based client, a native mobile application, a script running on client device 210 that is not human-facing, etc. Herein, a "user" is one or more humans interfacing with client device 210 or one or more processes running on client device 210. Server device 220 runs account service 110, auth service 120, auth UI server 130, and a listener service 222. Furthermore, server devices 240 and 250 run respective web servers 242 and 252, each of which serves one or more pages for application 100. For purposes of illustration, unless otherwise indicated, web server 242 is AASD-enabled and web server 252 is not AASD-enabled.

Authentication Tiers

According to an embodiment, application 100 implements a plurality of hierarchical authentication tiers, where each authentication tier is associated with one or more authentication steps, such as username/password authentication, non-bot verification (such as Captcha), knowledge-based authentication (KBA), multi-factor authentication (MFA), etc. For example, application 100 includes actions that are associated with the following example authentication tiers:

Public Authentication Tier: Requires no authentication steps. According to an embodiment, a client session that is not associated with an authentication tier is, by default, associated with the public authentication tier. According to an embodiment, the public tier is considered to be the lowest-security tier in the hierarchy, lower than the first authentication tier, and is associated with a null set of authentication steps. When associated with the public authentication tier, a client has access to public data only, which does not include any PII. However, the client may receive targeted experience based on cookie tracking. For example, while a user of client 212 is not logged in and based on one or more cookies in a cookie store 214 maintained at client device 210, application 100 serves, to client 212, a public web page with one or more relevant news articles.

First Authentication Tier: Requires authentication by validation of username and password. A client session associated with the first authentication tier is considered a weak session, and the client has access to data with no critical user/account information, such as blog, articles, news, public materials, and basic account information without PII.

Second Authentication Tier: In addition to first authentication tier authentication mechanisms, KBA is also required. A session associated with the second authentication tier has stronger security than a session associated with the first authentication tier, but still is not considered as strong as higher tiers because KBA data can be obtained via social engineering. A client session associated with the second authentication tier allows the client access to basic user/account data, including some PII, but is not able to edit any PII.

Third Authentication Tier: In addition to first authentication tier authentication mechanisms, MFA is also required. According to an embodiment, KBA is also required. The third authentication tier provides the strongest security, and, as such, a client session associated with the third authentication tier has access to the most critical user/account information, including all PII, as well as the ability to edit PII.

According to an embodiment, each higher tier in the hierarchy provides access to one or more restricted actions in addition to any actions associated with all lower tiers. As such, restricted actions (including viewing a restricted page, viewing restricted information on a lower-security page, editing PII, etc.) are associated (either explicitly or implicitly) with an authentication tier. Restricted pages are associated with a non-public authentication tier, and access to that page is dependent on the client authenticating to at least the associated authentication tier. Furthermore, information included in a page, or actions available from a page, may be associated with an authentication tier that is different than the authentication tier associated with the page (if any). For example, a given page is associated with the first authentication tier and a restricted action accessible from the given page (such as editing PII) is associated with a higher authentication tier. A client that is authenticated to at least the first authentication tier may view the given page, but must be authenticated to at least the higher authentication tier in order to perform the restricted action accessible from the page.

To illustrate, login page 132 is a public page and, as such, is not associated with any authentication tier and may be accessed by clients that have not yet performed any authentication steps. Example pages 244 and 256 are associated with the first authentication tier, and are referred to herein as first-tier pages ("1TP"). Example page 246 is associated with the second authentication tier, and is referred to herein as a second-tier page ("2TP"). Further, example page 254 is associated with the third authentication tier, and is referred to herein as a third-tier page ("3TP").

According to an embodiment, a client that requests an action that is associated with an authentication tier that is at least two tiers higher than the authentication tier associated with the current client session is able to perform the action after solving the authentication challenge(s) associated with the requested action without solving the authentication challenges for intervening authentication tiers. According to another embodiment, as described in detail below, such a request is granted after the client has solved all authentication challenges associated with the tier of the requested action and the authentication challenges for any intervening authentication tiers between the tier of the requested action and the current client session tier.

AASD Eligibility

According to an embodiment, in order to be eligible for AASD, each restricted action for application 100, and the associated authentication tier, is registered with auth service 120. Auth service 120 maintains an AASD registry, in authentication dataset 122, that maps each registered restricted action (e.g., identified by a target URL that may contain an action other than viewing the target URL therein, e.g., as a parameter in the URL) to the associated authentication tier. For example, web server 242, which is AASD-enabled, is configured to serve a new page 244. Web server 242 sends a registration message, to auth service 120, with an identifier of page 244 and an identifier of the first authentication tier. Based on the registration message, auth service 120 records, in the AASD registry, that page 244 (or the action of viewing page 244) is associated with the first authentication tier. According to an embodiment, web server 242 proves, to auth service 120, that the registration of page 244 is not fraudulent, including by using an encryption protocol to encrypt one or more portions of the registration message, by providing authentication information to authenticate web server 242 in connection with the registration message, etc.

The AASD registry is used by auth service 120 to determine what authentication tier is needed to perform a given restricted action, and allows auth service 120 to defer AAS for restricted actions that do not require the highest authentication tier. Thus, an action is not AASD-eligible when the action is not registered with auth service 120, or when the request to validate the session in connection with a client request for the action is not accompanied by information identifying the context of the request. According to an embodiment, any request for a restricted action from a web server that does not implement functions required for AASD is treated as a highest-tier request and no AAS is deferred for that request.

Caller Context

An AASD-enabled web server sends, to auth service 120 with a session validation request, additional caller context information that identifies a restricted action that initiated the session validation request. Auth service 120 uses the context information to identify the authentication tier that is required for the current client request. According to an embodiment, caller context is an optional field, called "map", in the validate session message to auth service 120. Specifically, the map data field is configured to provide extra context about the caller that requested the restricted action. For example, auth UI server 130 is a special case server, and is configured to include, in validate session requests to auth service 120, caller context information in the map field that identifies auth UI, e.g., {"caller_context": {"target_page": "auth_UI"}}. As another example, web server 242 is a typical (non-special case) AASD-enabled server, and is configured to include, in validate session requests to auth service 120, caller context information in the map field that identifies the requested restricted action, e.g., {"caller_context":{"target_page": "page_244"}}.

According to an embodiment, if a particular request is from a trusted source, such as a source that is known to be controlled by the same entity as the destination, then the context information may contain an unencrypted identifier of the target restricted action. Otherwise, auth service 120 requires that the caller context information contain encrypted text. According to an embodiment, the encrypted text includes both the identifier of the target restricted action and the session identifier. Because the session identifier in the request is part of the encrypted text, the encrypted text is unique for each session, and the encrypted text cannot be easily faked by copying the encrypted text from a request associated with another session. Furthermore, the encrypted text for the caller context may also include a timestamp for further added security.

Encryption for caller context information can be achieved in any way, including encryption using a private key of the calling server. Auth service 120 decrypts the context information using the corresponding public key. In such an embodiment, auth service 120 manages and stores the encryption keys for all web servers from which requests to auth service 120 are expected, or obtains the needed encryption keys from one or more other secure services. Encryption can also be achieved using a symmetric key. Specifically, auth service 120 generates one or more symmetric keys and assigns each key to a service or group of services.

Deferring Additional Authentication Steps for an AASD-Eligible Action

Figure 3A:
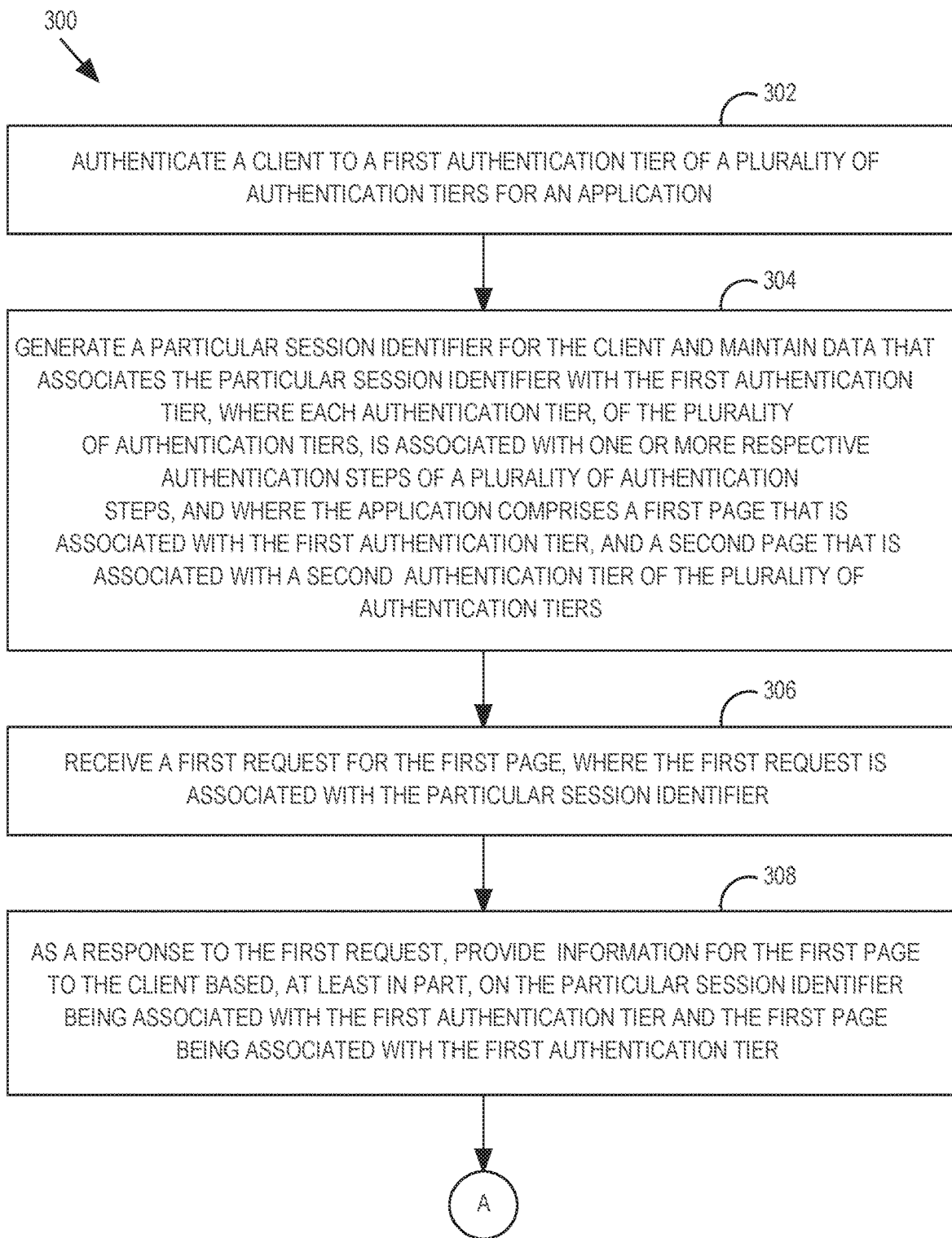
FIGS. 3A-3B depict a flowchart for deferring additional authentication steps that are not required for a given requested restricted action.
Figure 3B:
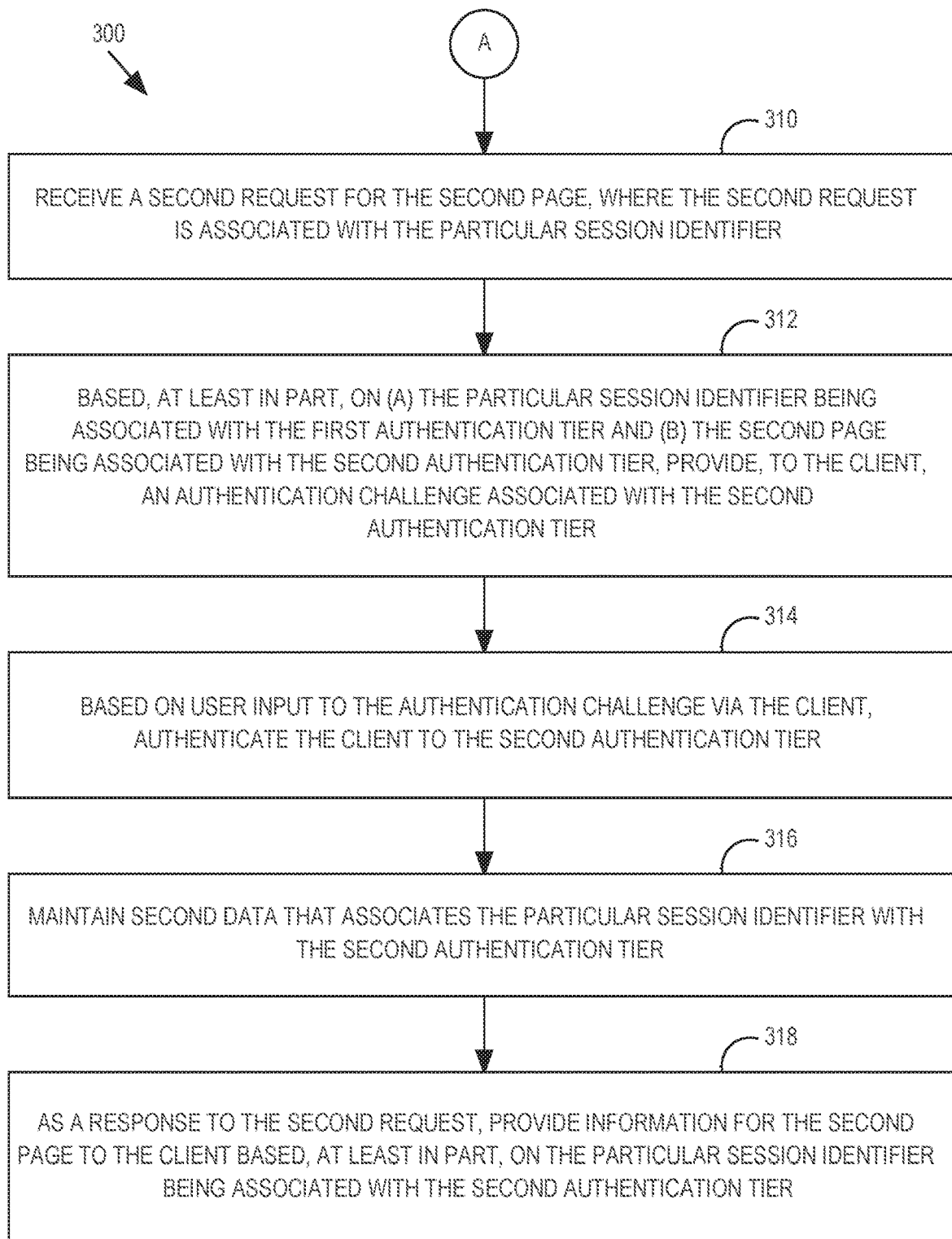

FIGS. 3A-3B depict a flowchart 300 for deferring additional authentication steps that are not required for a given requested restricted action, according to one or more embodiments. Specifically, at step 302 of flowchart 300, a client is authenticated to a first authentication tier of a plurality of authentication tiers for an application. For example, before performing any authentication steps for application 100, client 212 requests page 244 of application 100, which is a 1TP. The request for page 244 goes to web server 242, which attempts to retrieve a session identifier for the current client session.

Session identifiers may be persisted in various ways. For example, client 212 is a browser-based client, and auth service 120 causes the session identifier to be sent to client 212, which stores the session identifier in a cookie store 214. Techniques are described herein as using cookie store 214 to store session identifiers, as a non-limiting illustration. As a further example, client 212 is a native mobile application, and auth service 120 uses an application programming interface (API) gateway to exchange tokens with client 212, which may be implemented using OAuth, etc. In the case of a token-based authentication system, client 212 receives a token that represents the user session rather than the session identifier to be stored as a cookie.

In this example, web server 242 attempts to retrieve a session identifier for the current client session from cookie store 214. In this case, there is no session identifier for a current client session because a session has not yet been established with application 100. Accordingly, web server 242 automatically reroutes client 212 to login page 132 at auth UI server 130. According to an embodiment, auth UI server 130 attempts to retrieve a session identifier from client 212, but does not find any cookie for the session. Accordingly, Auth UI server 130 serves login page 132 to client 212.

Figure 4A:
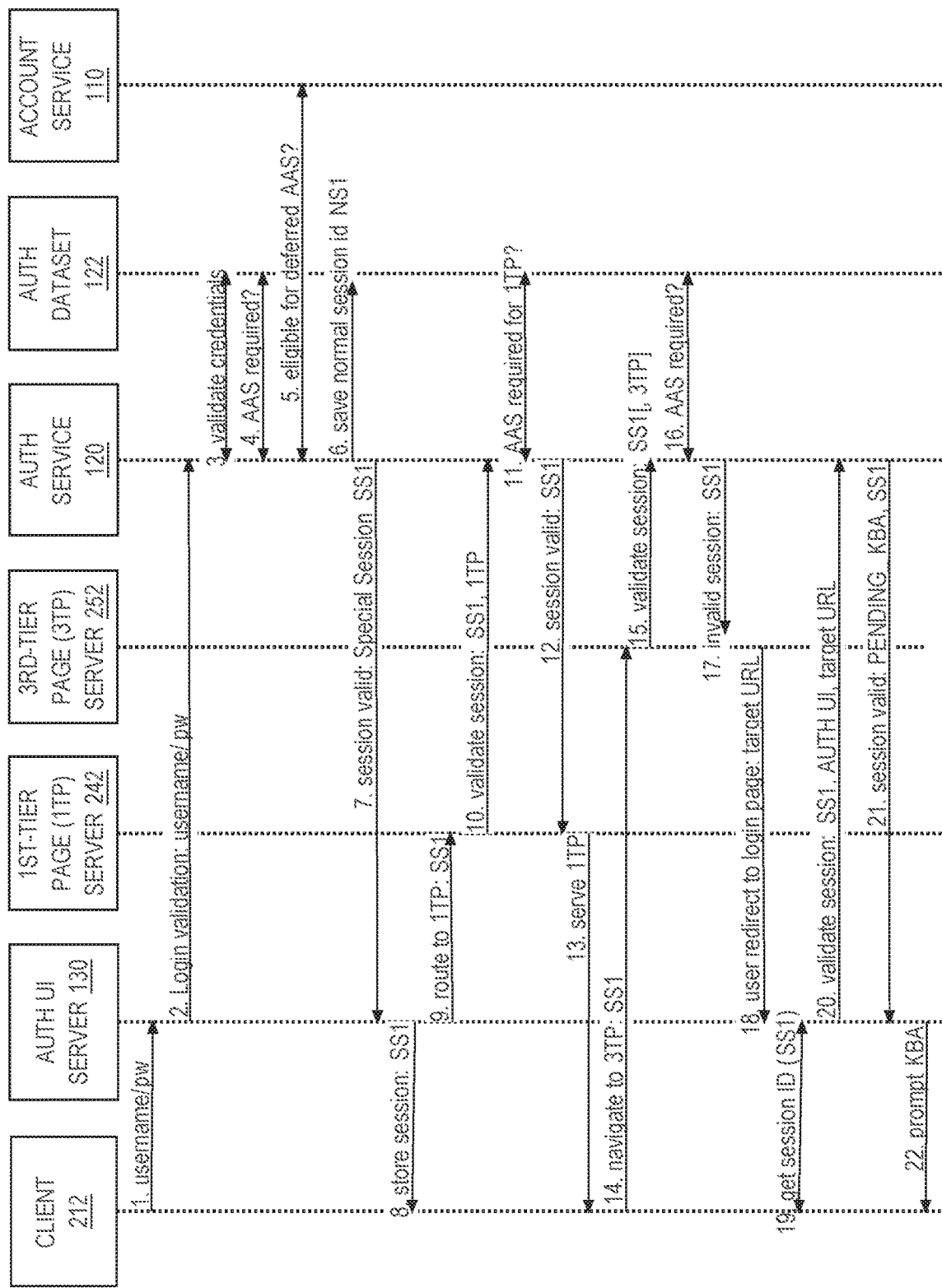
FIGS. 4A-4B depict a flowchart of interactions between entities in an example network arrangement to enact additional authentication step deferral for requested restricted actions of an application.
Figure 4B:
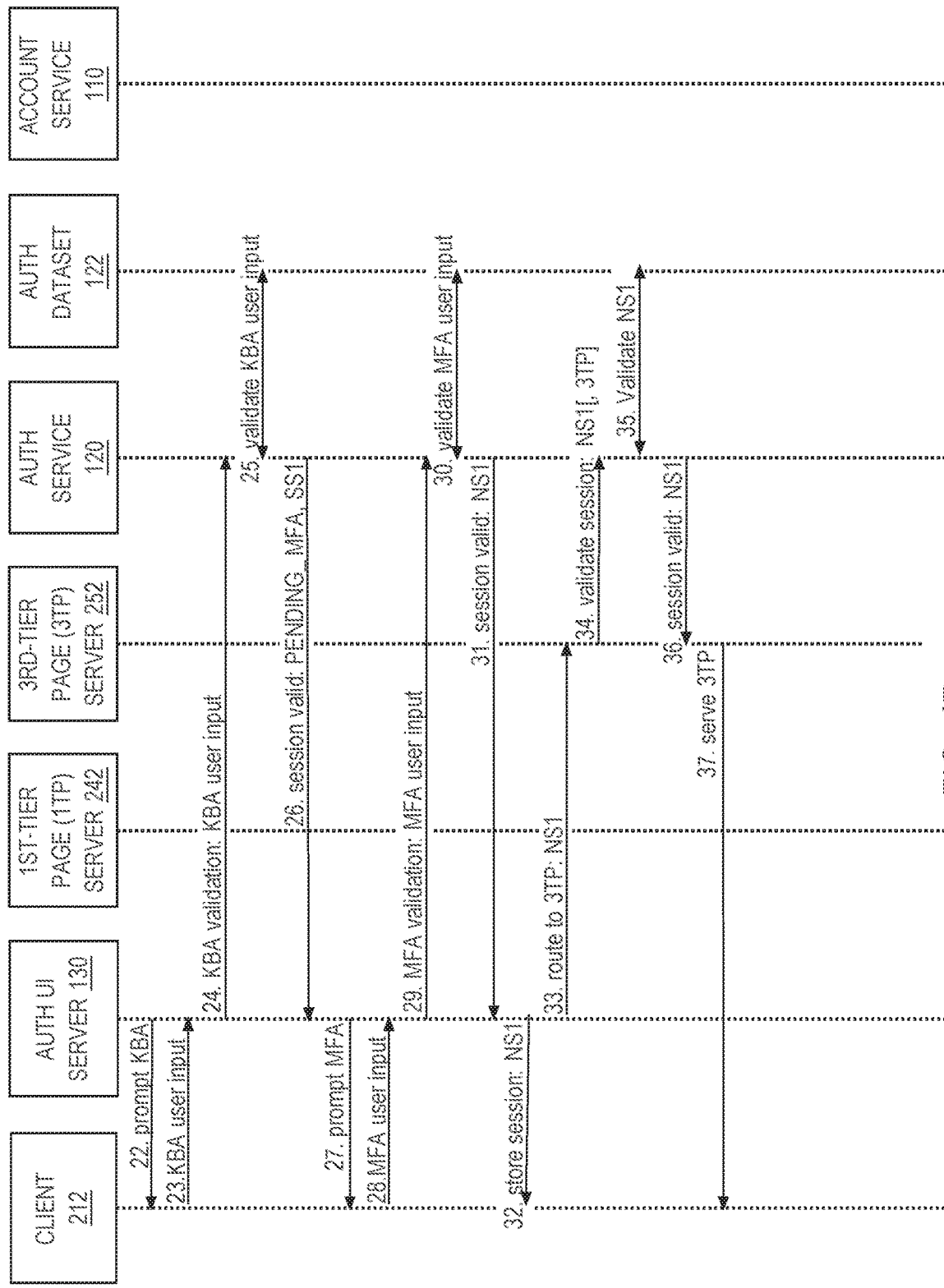

FIGS. 4A-4B depict a flowchart 400 of interactions between entities depicted in FIG. 2 to enact AASD for requested restricted actions of application 100. As depicted at step 1 of flowchart 400, through client 212, a user enters user credentials (e.g., a username and password) into login page 132. At step 2 of flowchart 400, auth UI server 130 sends the username and password to auth service 120 for validation. At step 3 of flowchart 400, based on information stored in authentication dataset 122, auth service 120 determines whether the user credentials are valid. In this example, the user credentials are valid.

At step 4 of flowchart 400, auth service 120 determines whether AAS are required for page 244, e.g., based on caller context information sent with the login validation message. According to an embodiment, to determine whether AAS are required for the requested action, auth service 120 first determines whether the user associated with the username and password has opted out of AAS requirements. If the user has opted out of AAS, no AAS is required for requests associated with the current client session, and the first authentication tier is sufficient to perform all restricted actions of application 100.

However, if the user has not opted out of AAS, then the requested action potentially requires AAS based on which authentication tier (if any) is associated with the action in the AASD registry in authentication dataset 122. According to an embodiment, auth service 120 checks the registration information stored in the AASD registry to determine the authentication tier associated with page 244, which is the first authentication tier. Because the first authentication tier requires only username and password, auth service 120 determines that no AAS are required (beyond the username and password verification, which was already performed).

In the embodiment depicted in flowchart 400, at step 5, auth service 120 determines whether client 212 is eligible for AASD, e.g., based on information maintained by account service 110 or based on information maintained by auth service 120 in authentication dataset 122, etc. This step allows application 100 to deny AASD for particular clients or users (based on username and password), depending on an implementation. For purposes of the present example, either auth service 120 does not perform step 5, or auth service 120 performs step 5 and determines that the user or client 212 is eligible for AASD.

Special Session Identifiers

At step 304 of flowchart 300, a particular session identifier is generated and data that associates the particular session identifier with the first authentication tier is maintained, where each authentication tier, of the plurality of authentication tiers, is associated with one or more respective authentication steps of a plurality of authentication steps, and where the application comprises a first page that is associated with the first authentication tier, and a second page that is associated with a second authentication tier of the plurality of authentication tiers. For example, auth service 120 generates a normal session identifier (NS1) for client 212 and saves NS1 in authentication dataset 122, as depicted in step 6 of flowchart 400.

For client sessions that request restricted actions that are eligible for AASD, auth service 120 generates and tracks a special session identifier. Thus, in connection with the user credential validation request, auth service 120 also generates a special session identifier (SS1) for client 212. According to an embodiment, auth service 120 generates SS1 for client 212 by generating a random session identifier to be SS1 and mapping the random special session identifier to NS1 in mapping data maintained in authentication dataset 122. In this embodiment, auth service 120 stores SS1 in dataset 122 (e.g., in a separate table in dataset 122 from the normal session identifiers, or with a flag to indicate that SS1 is a special session identifier, etc.). According to another embodiment, auth service 120 generates SS1 for client 212 by encrypting NS1. For example, auth service 120 uses a secret key to encrypt NS1 to generate SS1. The same key can be used to decrypt SS1 to identify the associated normal session identifier for the client session, i.e., NS1; in this embodiment, SS1 does not need to be saved to authentication dataset 122 because SS1 can be derived from NS1, which is saved in dataset 122.

Based on the validation of the user credentials (which is the only authentication step that has been completed by client 212 for the current client session), auth service 120 associates SS1 with the first authentication tier, either explicitly or implicitly via NS1. A session that is identified, by a client, via a special session identifier is eligible for AASD while a session that is identified, by the client, using a normal session identifier is not eligible for AASD. Thus, according to embodiments, using special session identifiers, authentication steps other than login with username and password are deferred until restricted actions associated with higher-security authentication tiers are requested.

At step 7 of flowchart 400, auth service 120 sends a session valid message with SS1 to auth UI server 130 as a response to the request to for user credential validation (from step 2). At step 8 of flowchart 400, in response to receiving the session valid message, auth UI server 130 sends SS1 to client 212 to store in cookie store 214. According to embodiments, client 212 uses SS1 as it would a normal session identifier, i.e., to identify the current client session in future communications with application 100.

Deferral of Additional Authentication Steps Based on Special Session Identifier

At step 306 of flowchart 300, a first request for the first page is received, where the first request is associated with the particular session identifier. For example, after receiving SS1 from auth service 120, auth UI server 130 automatically reroutes client 212 to page 244 (the originally-requested page) with SS1 as the session identifier, as shown in step 9 of flowchart 400. Accordingly, web server 242 receives the reroute request.

While this example shows the first request as a reroute request, the first request may be a direct request for a page from client 212, e.g., a request for a 1TP while the current client session is associated with the first authentication tier. Furthermore, it is noted that, in an example where the client request was initially for login page 132 and page 244 is the default landing page after login, then the process would be very similar to that described above for the client 212 request for page 244 before being logged in. One difference would be that the initial request would be directly routed to auth UI server 130, and then, once client 212 had been issued a special session identifier as described above, auth UI server 130 automatically reroutes client 212 to page 244 based on that page being the default landing page after client login.

At step 308 of flowchart 300, as a response to the first request, information for the first page is provided to the client, based, at least in part, on the particular session identifier being associated with the first authentication tier and the first page being associated with the first authentication tier. For example, in response to receiving the request to route client 212 to page 244, web server 242 sends a message to auth service 120 to validate the client session based on SS1 and context information identifying page 244, as shown in step 10 of flowchart 400. Upon receiving this request to validate the client session identified by SS1, at step 11 of flowchart 400, auth service 120 checks authentication dataset 122 to determine whether the authentication tier associated with SS1 is the same as the authentication tier associated with page 244 (identified based on the caller context information sent from web server 242).

While web servers request validation of client sessions based on both normal session identifiers and special session identifiers in the same way, which allows for backwards compatibility, auth service 120 validates special session identifiers differently than normal session identifiers. According to an embodiment, auth service 120 uses the presence of context information in a validate session request as an indicator that the session identifier in the request is a special session identifier. Accordingly, in order to validate SS1, auth service 120 attempts to derive a normal session identifier from SS1, where the process of deriving the normal session identifier depends on how special session identifiers are generated. In this case, auth service 120 derives NS1 from SS1, e.g., based on SS1 being mapped to NS1 in mapping data in dataset 122, or based on decrypting SS1 to generate NS1, etc.

According to an embodiment, if the received session identifier (which was assumed to be a special session identifier based on being accompanied by context information) does not map to a valid normal session identifier, then auth service 120 attempts to validate the received session identifier as a normal session identifier. If the received session identifier is a normal session identifier, then the request is processed without AASD. According to another embodiment, if the received session identifier (which was assumed to be a special session identifier based on being accompanied by context information) does not map to a valid normal session identifier, then auth service 120 determines that the client session is invalid.

In this example, auth service 120 derives NS1 from SS1. After deriving NS1, auth service 120 attempts to validate the client session based on NS1, i.e., using normal session identifier information stored at dataset 122. If, based on the normal session identifier, the client session is determined to be invalid, auth service 120 sends a message to the requesting entity indicating that the session is invalid. However, if, based on the normal session identifier, the client session is determined to be valid, then auth service 120 identifies an authentication tier associated with the special identifier within dataset 122. In this case, auth service 120 determines that NS1 is valid. As such, auth service 120 identifies an authentication tier associated with SS1 in dataset 122, which is the first authentication tier. Auth service 120 further identifies an authentication tier associated with page 244 is the AASD registry in dataset 122, which is also the first authentication tier.

Because both SS1 and page 244 are associated with the first authentication tier, auth service 120 determines that no AAS is required for client 212 to access page 244. In other words, authentication steps associated with authentication tiers that are higher-security than the first authentication tier are deferred until client 212 requests an action that requires a higher-security authentication tier. Thus, at step 12 of flowchart 400, auth service 120 sends a message to server 242 indicating that the session identified by SS1 is valid, which works as authorization for web server 242 to serve page 244 to client 212. In response to receiving the message that the session is valid, at step 13 of flowchart 400, server 242 serves page 244 to client 212 (e.g., for client 212 to render on a display device).

Requiring Additional Authentication Steps for a Restricted Action

Returning to the previous example, if, while SS1 is associated with the first authentication tier, client 212 issues a request (associated with SS1) for a restricted action that is associated with an authentication tier that is higher-security than the first authentication tier, auth service 120 requires AAS before allowing the restricted action to be performed.

To illustrate, at step 310 of flowchart 300, a second request for the second page is received, where the second request is associated with the particular session identifier. For example, as depicted at step 14 of flowchart 400, client 212 navigates to page 254, which is a 3TP, where the request is associated with SS1. Web server 252 receives the request for page 254. This example is described with web server 252 being either AASD-enabled or non-AASD-enabled, in the alternative. According to an embodiment, steps 312-318 of flowchart 300 are performed in response to receiving the second request.

At step 312 of flowchart 300, based, at least in part, on (a) the particular session identifier being associated with the first authentication tier and (b) the second page being associated with the second authentication tier, an authentication challenge associated with the second authentication tier is provided to the client. For example, in response to receiving the request from client 212 to navigate to page 254, where the request includes SS1, web server 252 sends a request to auth service 120 to validate the session identified by SS1, as depicted in step 15 of flowchart 400.

In the embodiment that web server 252 is not AASD-enabled, the validation request of step 15 is not accompanied by caller context information identifying page 254. In this case, based on the lack of caller context in the validate session request, auth service 120 validates SS1 as if it were a normal session identifier, which fails because SS1 is not listed as a normal session identifier in dataset 122. According to an embodiment, in response to SS1 failing to validate as a normal session identifier, auth service 120 attempts to validate SS1 as a special session identifier, which, in this case, does not fail, and proceeds as described below. (If the received session identifier also fails to validate as a special session identifier, then the client session is invalid.) This embodiment allows application 100 to leverage any authentication steps that have been performed in connection with the current session.

At step 16 of flowchart 400, auth service 120 determines whether AAS is required to perform the requested action. When no context information accompanies a session validation request, auth service 120 determines that the requested action is implicitly associated with the highest-security authentication tier, and all authentication steps required to perform a restricted action associated with the highest-security authentication tier are required to perform the action. As discussed above, in the case that web server 252 is AASD-enabled, page 254 is associated with the third (i.e., highest-security) authentication tier of application 100 in the AASD registry, and all authentication steps required to perform a restricted action associated with the third authentication tier are required to view page 254. Thus, according to an embodiment, web server 252 not being AASD-enabled has the same end result as if web server 252 were AASD-enabled, i.e., requiring client 212 to perform the AAS needed to access a third-tier restricted action.

More specifically, at step 16 of flowchart 400, auth service 120 determines that SS1 is associated with the first authentication tier and page 254 is associated with the third authentication tier. Based on the authentication tier associated with SS1 being lower than the authentication tier associated with page 254, auth service 120 determines that AAS is required for client 212 to navigate to page 254. Based on this determination, and even though the session has not timed out and the user has not logged out of application 100, auth service 120 sends a message to web server 252 indicating that the session associated with SS1 is invalid, as depicted in step 17 of flowchart 400.

Generally, a message of session invalidity is sent when the client session is invalid, e.g., because there has not been a session established, the session has timed out, the client previously logged out of the session, etc. However, according to one or more embodiments, the message of invalidity sent at step 17 of flowchart 400 is used as a tool to force web server 252 (which may or may not be AASD-enabled) to redirect the request for the restricted action to auth UI server 130, which implements AASD functionality. Auth UI server 130 then works with auth service 120 (as described in detail below) to ensure that all AAS required for the requested restricted action is performed before the client is allowed to perform the restricted action. The redirection of requests to auth UI server 130, using the invalid session message, allows for backwards compatibility such that not all web servers implementing application 100 are required to be AASD-enabled.

Accordingly, in response to receiving the message that the session is invalid, web server 252 redirects client 212 to auth UI server 130, as depicted by step 18 of flowchart 400. According to an embodiment, the redirection request includes information identifying the target action of the original request, e.g., in this case, a URL identifying page 254 or caller context. At step 19 of flowchart 400, auth UI server 130 retrieves the session identifier (SS1) from client 212 (e.g., stored in cookie store 214), and, at step 20, auth UI server 130 validates the session with auth service 120 based on SS1 and context information that identifies auth UI server 130, as well as the target URL (or caller context) of the original request.

Because the context information of the session validation request identifies auth UI server 130, which is the special-case web server implementing AASD functionality, auth service 120 does not respond to this validation request with an invalid session indicator, but instead responds to the request with an indication that the session is valid (at step 21 of flowchart 400).

The valid session message sent to auth UI server 130 is accompanied by an indicator of one or more authentication steps needed for the client to satisfy requirements for the authentication tier associated with the requested action. According to an embodiment, the indicator comprises a status identifier that is associated with SS1 in dataset 122. According to an embodiment, the status identifier is an identifier of the authentication tier associated with SS1. In the example session valid message of step 21 in flowchart 400, the status identifier is "PENDING_KBA", which is a non-limiting example of a status identifier for the first authentication tier. Because requests for restricted actions are rerouted to auth UI server 130 using an invalid session message, and auth UI server 130 then receives, from auth service 120, a valid session message with information about AAS required for the requested action, the authentication steps are tied together such that continuity is maintained between what the user has previously done for authentication and what is still left to do in order to gain access to all possible actions within application 100.

Based on the status identifier, such as PENDING_KBA depicted in step 21 of flowchart 400, auth UI server 130 prompts the user to perform one or more AAS associated with the status identifier. For example, at step 22 of flowchart 400, auth UI server 130 serves an authentication challenge page 134A, which includes a KBA challenge, to client 212.

At step 314 of flowchart 300, based on user input to the authentication challenge via the client, the client is authenticated to the second authentication tier. For example, at step 23 of flowchart 400, a user enters KBA information into authentication challenge page 134A via client 212, and, at step 24, auth UI server 130 sends the received KBA information to auth service 120 for validation. At step 25 of flowchart 400, auth service 120 validates the KBA information based on authentication dataset 122. Upon determining that correct KBA information was entered, where KBA is the authentication step associated with the second authentication tier, auth service 120 associates SS1 with the second authentication tier in dataset 122.

For purposes of illustration, the following explains what would happen if the requested page were associated with the second authentication tier (a 2TP). In this case, auth service 120 sends a session valid message with the special session identifier and without a status indicator, which works as authorization to route client 212 the 2TP. In response to the valid session message, auth UI server 130 sends a request to redirect client 212 to the AASD-enabled web server that serves the 2TP. In this case, when the web server sends a request to validate SS1 with context information identifying the 2TP, auth service 120 determines that the authentication tier associated with SS1 matches the authentication tier associated with the 2TP (i.e., the second authentication tier), and sends a session valid message to the AASD-enabled web server, resulting in the 2TP being served to client 212, in a manner similar to steps 10-13 of flowchart 400.

Returning to the illustration in which the requested page 254 is a 3TP, in response to validating the entered KBA information, at step 26 of flowchart 400, auth service 120 sends another session valid message, to auth UI server 130, with a second status indicator based on SS1 being associated with the second authentication tier, such as "PENDING MFA". At step 27 of flowchart 400, based on receiving the valid session message with the "PENDING MFA" status, which is associated with an MFA challenge page 134B, auth UI server 130 serves MFA challenge page 134B to client 212. As depicted in step 28 of flowchart 400, a user enters information into authentication challenge page 134B, and, at step 29, auth UI server 130 sends the MFA information to auth service 120 for validation. At step 30 of flowchart 400, auth service 120 validates the MFA information based on authentication dataset 122.

At step 316 of flowchart 300, second data that associates the particular session identifier with the second authentication tier is maintained. For example, upon determining that MFA information from client 212 is validated, auth service 120 associates SS1 with the third authentication tier of application 100 in dataset 122.

At step 318 of flowchart 300, as a response to the second request, information for the second page is provided to the client based, at least in part, on the particular session identifier being associated with the second authentication tier. For example, as depicted in step 31 of flowchart 400, after associating SS1 with the third authentication tier, auth service 120 sends a session valid message to auth UI server 130 with the normal session identifier (NS1) that is associated with SS1, according to an embodiment. This valid session message (without a status identifier) works to authorize routing client 212 to the target page 254. At step 32 of flowchart 400, auth UI server 130 causes client 212 to store NS1 in cookie store 214 as the new identifier of the current client session.

Furthermore, based on the valid session message of step 31, auth UI server 130 routes client 212 to page 254 at web server 252, as shown in step 33 of flowchart 400. At step 34, web server 252 sends a message (with or without caller context information identifying page 254, as described in detail above) to auth service 120 to validate the client session based on NS1. At step 35 of flowchart 400, auth service 120 validates the current client session based on NS1, which, the session identifier being a normal session identifier, no longer depends on AASD functionality. At step 36, in response to determining that the client session identified by NS1 is valid, auth service 120 sends a session valid message to web server 252 with NS1. At step 37, based on the valid session message, web server 252 provides the information for page 254 to client 212, e.g., to render at a display device.

Functioning of Web Servers that are not AASD-Enabled

The following illustrates functioning of a non-AASD-enabled web server, such as web server 252. In this example, web server 252 serves one or more web pages that may or may not be restricted web pages, i.e., where requests to view the web pages are restricted actions. Client 212, which has not yet established a session with application 100, requests page 254, which is served by non-AASD enabled web server 252. The request is routed, via network 230, to web server 252 on server device 250. According to an embodiment, when a web server implementing application 100 receives a request for a web page, the web server sends a request to auth service 120 (on server device 220) to validate the session (if any) associated with the page request. In this case, web server 252 does not have a session identifier to send to auth service 120, nor does it send any context information identifying the page that was requested by client 212 (because the web server does not implement AASD functionality). Based on the lack of session identifier with the request, auth service 120 sends a message to web server 252 indicating that the session is invalid.

As a response to receiving the message that the session is invalid, web server 252 automatically reroutes client 212 to login page 132, which reroute request goes to auth UI server 130. In response to the reroute request, auth UI server 130 serves login page 132 to client 212. Once a user enters credentials into login page 132, and auth service 120 validates the entered credentials, auth service 120 generates a normal session identifier for the client session, as described above in connection with steps 1-6 of flowchart 400.

Because web server 252 is not AASD-enabled, and does not include AASD-enabling caller context in the session validation request, auth service 120 does not produce a special session identifier for the session, but instead sends the normal session identifier to auth UI server 130 to be stored at client 212. As such, auth service 120 sends the generated normal session identifier and an indicator stating that one or more AAS is required to auth UI server 130. In response to this message, auth UI server 130 automatically provides one or more authentication challenge pages 134A-N to client 212. Auth UI server 130 sends any entered information to auth service 120, and auth service 120 determines whether the one or more AAS have been satisfied, as described above.

In response to determining that the required AAS has been satisfied, auth service 120 sends a message to auth UI server 130 that client 212 has an active session identified by the normal session identifier. Auth UI server 130 sends the normal session identifier to client 212 to store in cookie store 214. Auth UI server 130 then routes client 212 to page 254 at web server 252. According to an embodiment, web server 252 again sends a message to auth service 120 to determine if the session is valid. Auth service 120 confirms that the session is valid and, accordingly, web server 252 serves page 254 to client 212 (e.g., for client 212 to render on a display device).

Alternatives and Extensions

Users may come to the login page organically or may try to access any page directly by providing the URL of another page instead of the URL of login page 132. Before a user is routed to any new page from any page of application 100, auth service 120 is called to validate the session.

The following use cases illustrate embodiments of AASD:
1. User is an admin user that manages and accesses user info, where the username and password of the user is associated with an indication that the user is an admin user. For admin users, at step 5 of flowchart 400, the user is determined to be not eligible for AASD. Thus, admin users must go through all authentication challenges up-front.
2. User uses biometrics for login. If biometrics is used, then biometrics already provides another factor for the user. There is no need for challenging such users with MFA.

3. A user comes for login organically to access a 3TP of application 100. The following sequence of events happen:
   a. Events listed in steps 1 through 8 of flowchart 400 are followed (i.e., login through auth UI server 130, and storing SS1 as a session identifier in a cookie).
   b. Events listed in steps 14 through 37 of flowchart 400 are followed (potentially omitting authentication steps for intervening authentication tiers).
4. A user tries to access a 3TP of application 100 without coming to auth UI server 130. The following sequence of events happen:
   a. The web server for 3TP tries to get a cookie stored in the session, but it does not find any. The web server redirects the client to auth UI server 130 for login.
   b. Auth UI server 130 does not find any cookie in the session and, accordingly, prompts the client for credentials.
   c. It now follows the events as in use case 3.
5. A user comes for login organically to access a 1TP, such as page 256 of FIG. 2, where web server 252 does not implement AASD functionality.
   a. Steps 1 through 8 of flowchart 400 are followed.
   b. Before being redirected to page 256, web server 252 sends SS1 to auth service 120 for validation. This request does not contain a caller context.
   c. Auth service 120 does not find caller context in the validation request, so auth service 120 attempts to validate SS1 as if it were a normal session identifier. It fails.
   d. Steps 17 through 32 of flowchart 400 are followed.
   e. The user gets redirected to page 256.
6. A user comes directly to a 1TP, such as page 256 of FIG. 2, where web server 252 does not implement AASD functionality.
   a. Web server 252 tries to get a cookie stored for the session, but does not find any. Web server 252 redirects the client to Auth UI server 130 for login.
   b. Auth UI server 130 does not find any cookie for the session, and, as such, prompts the client for credentials.
   c. The steps in use case 5 are then followed.

Dynamically-Tiered Authentication

Dynamically-tiered authentication allows the authentication tier associated with a given client session to be automatically downgraded based on the client session satisfying one or more downgrade criteria. According to an embodiment, a client session satisfies downgrade criteria based on an explicit request for session downgrading, or based on passage of a pre-defined amount of time during which no activity (such as client interaction with the application, or activity on the client device) involving the higher-security authentication tier occurs. Unless the client session is downgraded to the public tier (i.e., the client is logged out of the application), automatically downgrading a client session restricts access to some authentication-based privileges for the client session without restricting access to all authentication-based privileges for the client session. Thus, session downgrading protects sensitive user information without the inconvenience that can be associated with logging a user out of the application.

Furthermore, according to an embodiment, the client session is upgraded based on an explicit request for session upgrade, or based on requesting a restricted action that requires a higher-security authentication tier than the tier associated with the current client session (as described in detail above).

Figure 5:
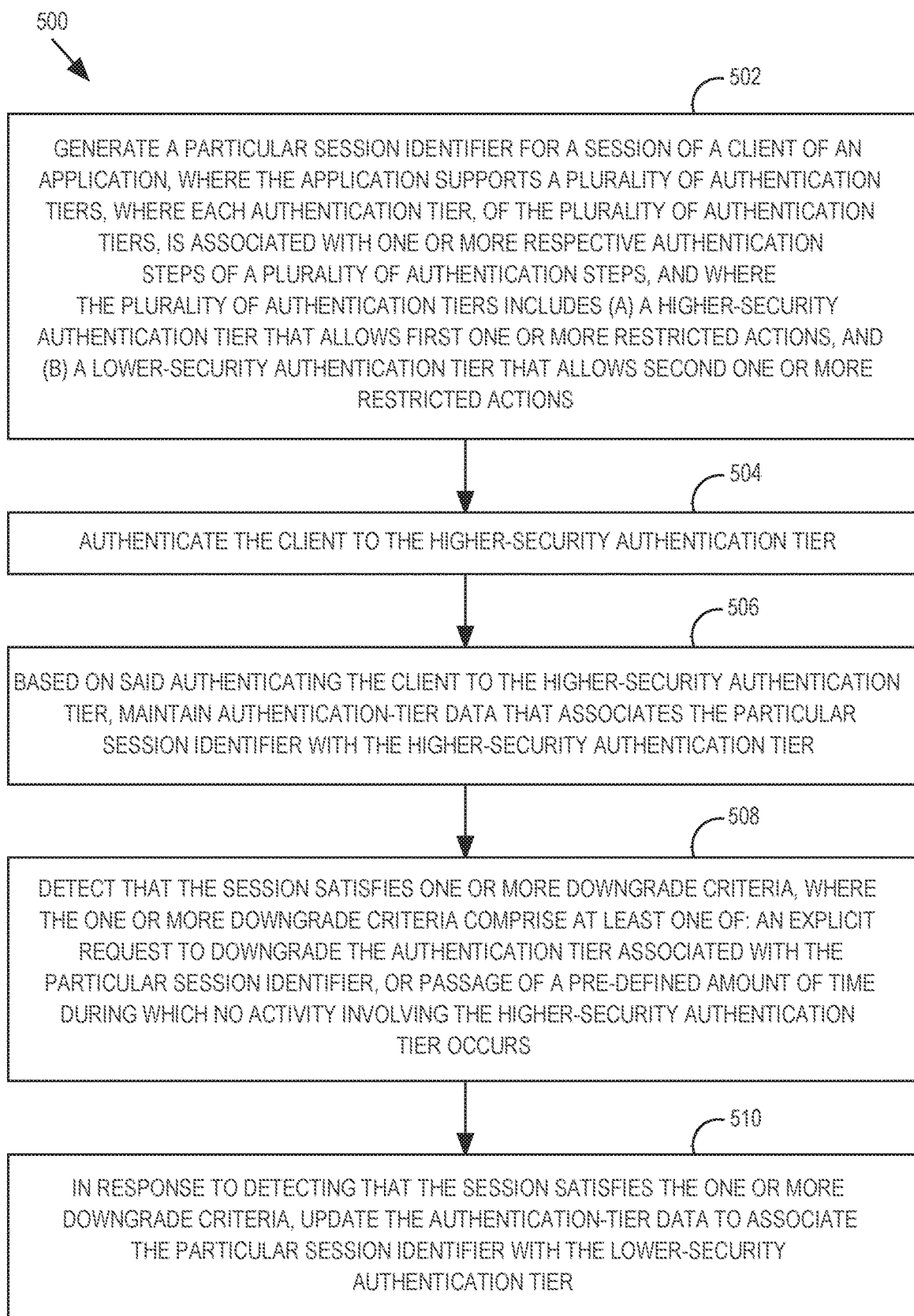
FIG. 5 depicts a flowchart for automatically downgrading the authentication tier of a client session.

FIG. 5 depicts a flowchart 500 for automatically downgrading the authentication tier of a client session, according to one or more embodiments. At step 502, a particular session identifier is generated for a session of a client of an application, where the application supports a plurality of authentication tiers, where each authentication tier, of the plurality of authentication tiers, is associated with one or more respective authentication steps of a plurality of authentication steps, and where the plurality of authentication tiers includes (a) a higher-security authentication tier that allows first one or more restricted actions, and (b) a lower-security authentication tier that allows second one or more restricted actions. Tiered authentication may be implemented in one or more ways for dynamically-tiered authentication, according to one or more embodiments. The system described above in connection with flowchart 400 is one way to implement tiered authentication. Flowchart 400 is used in many examples of dynamically-tiered authentication herein for purposes of illustration. However, this example implementation of tiered authentication is non-limiting regarding techniques for dynamically-tiered authentication.

As another example, tiered authentication is implemented such that a current authenticated tier is stored along with session data to indicate a tier associated with the current client session (e.g., requests from the client include a session ID, and authentication tier, and, at times, one or more AAS associated with the authentication tier). This technique is desirable because session can be stateful, but auth service 120 does not maintain the needed state. Instead, auth service 120 maintains focus on validating user input to authentication steps. However, according to another embodiment, auth service 120 is stateful and maintains authentication tiers related to currently valid (or invalid) client sessions. In both cases, auth service 120 either maintains authentication tier and/or one or more AAS associated with the authentication tier (KBA, MFA, etc.) for client sessions, or is able to retrieve that information from one or more other sources.

To illustrate step 502 of flowchart 500 in the context of flowchart 400, client 212 logs into application 100, as described above, e.g., in connection with steps 1-6 of flowchart 400. Based on the validated login information, auth service 120 generates a special session identifier for client 212, which is sent to client 212, as described above in connection with steps 7 and 8 of flowchart 400.

At step 504 of flowchart 500, the client is authenticated to the higher-security authentication tier. For example, after the client session for client 212 is established and the special session identifier (SS1) is associated with the first authentication tier, as described above, client 212 requests to navigate to page 254, which is a 3TP. Based on the request to navigate to page 254, application 100 authenticates client 212 to the third authentication tier, as described above in connection with steps 14-30 of flowchart 400. In this example, web server 252 is AASD-enabled.

At step 506 of flowchart 500, based on said authenticating the client to the higher-security authentication tier, authentication-tier data that associates the particular session identifier with the higher-security authentication tier is maintained. For example, auth service 120 stores, in mapping data of authentication dataset 122, a mapping between the identifier of the current client session, SS1, and the third authentication tier. It is noted that, at steps 31-32 of flowchart 400, client 212 receives a normal session identifier, NS1. However, according to an embodiment, client 212 continues to identify the current client session using SS1 (which is associated with NS1 is dataset 122). Identifying the client session using the special session identifier allows for efficient automatic session upgrades and downgrades, as described herein.

According to another embodiment, tier information is embedded in the encrypted session identifier. In this way, when auth service 120 (the service that decrypts encrypted session identifiers) decrypts the session identifier for a given client session, auth service 120 derives, from the session identifier, the authentication tier that is associated with the client session. This is one way to retrofit this solution to an existing system that would require heavy lifting to store additional (tier level) information in session management.
Downgrade Criteria At step 508, it is detected that the session satisfies one or more downgrade criteria, where the one or more downgrade criteria comprise at least one of: an explicit request to downgrade the authentication tier associated with the particular session identifier, or passage of a pre-defined amount of time during which no activity involving the higher-security authentication tier occurs. One or more pre-determined amounts of time used to determine whether a session satisfies downgrade criteria may be configured in any way, depending on the needs of the particular application.

Figure 6A:
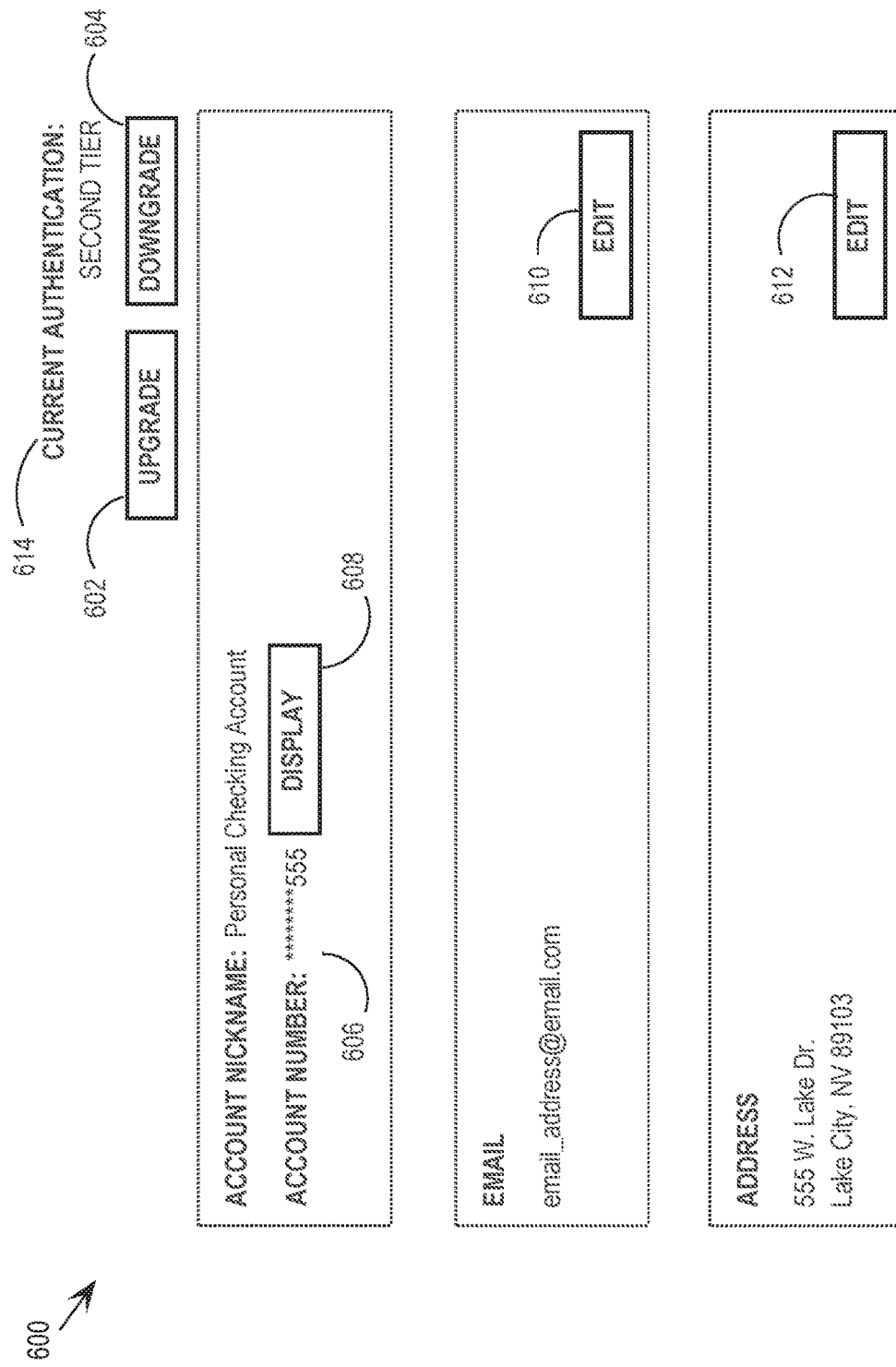
FIGS. 6A-6C depict example graphical user interfaces.
Figure 6B:
Figure 6C:
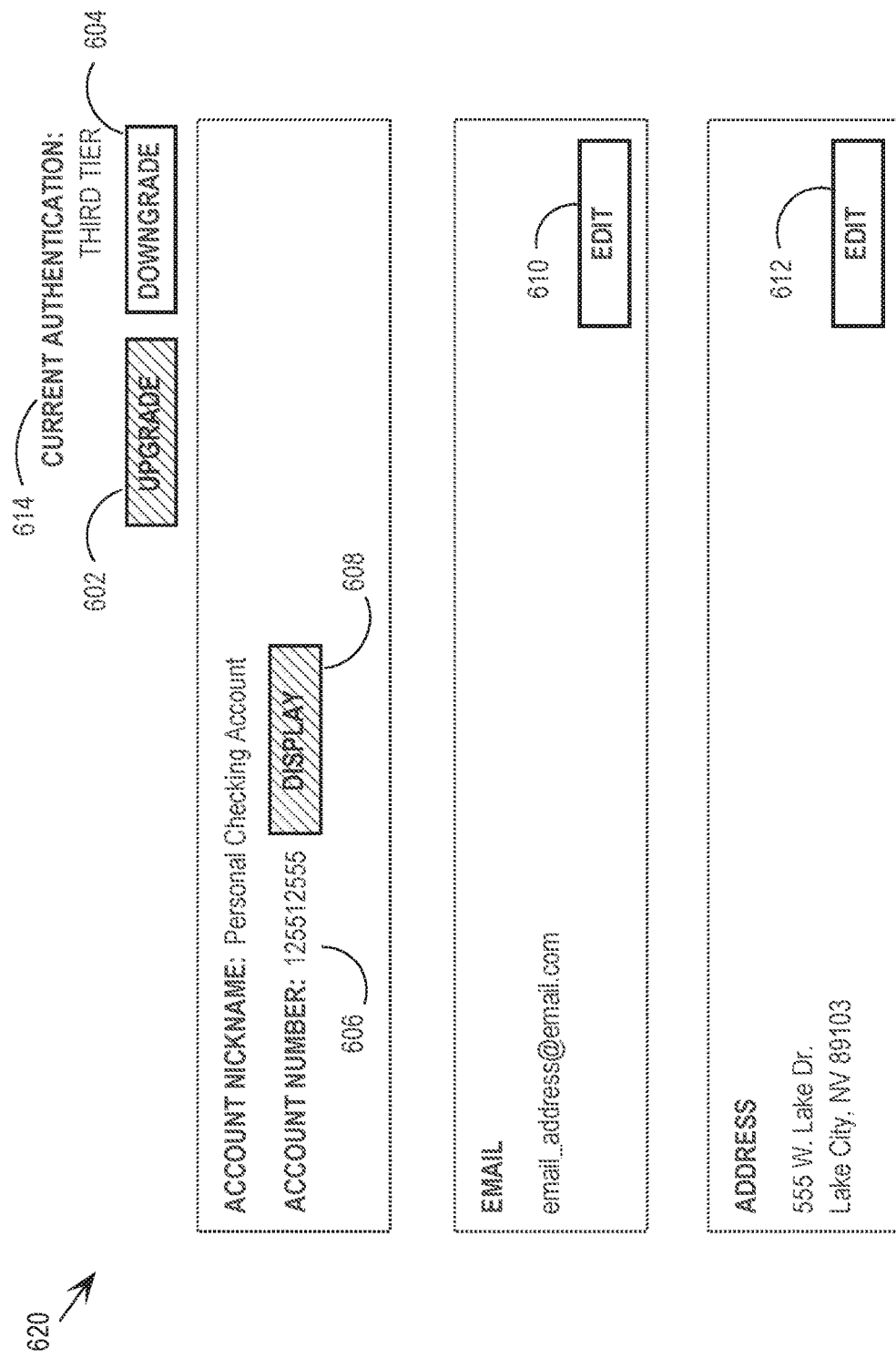

For example, the current client session for client 212 satisfies a downgrade criterion based on an explicit request to downgrade the session's authentication tier. To illustrate, FIGS. 6A-6C depict example graphical user interface (GUI) versions 600-620 for page 246, which is a 2TP. In this example, some third-tier restricted actions are accessible from page 246. More specifically, in the example of FIGS. 6A-6C, page 246 is an account settings page that includes some PII that is accessible by clients that are authenticated to the second authentication tier. This second-tier PII includes the account nickname, the last three digits of the account number (the rest of which is redacted because the full account number is associated with the third authentication tier), the account email address, and a physical address associated with the account.

Furthermore, GUI 600 of FIG. 6A includes a set of controls that requests restricted actions associated with the third authentication tier. Activation of one of these controls constitutes a request for a restricted action associated with the third authentication tier. This set of controls includes a display control 608 for displaying the full account number 606, an edit control 610 for editing the email address, and an edit control 612 for editing the physical address.

While client 212 is authenticated to the third authentication tier, the version of page 246 that is displayed at client 212 is GUI 620 of FIG. 6C. In GUI 620, account number 606 is fully displayed and display control 608 is deactivated. If, while client 212 is associated with the third authentication tier, either of edit controls 610 or 612 are activated, because client 212 is authenticated to the third authentication tier, the client is permitted to perform the associated restricted action without further authentication steps being required.

According to an embodiment, auth service 120 validates whether a tier-specific operation is permissible according to tier and data fields mapping (as described in further detail below). This embodiment prevents client session that are associated with lower-security authentication tiers from accessing the higher-security operation without permission. However, in micro services-oriented architecture, this may cause performance degradation because every operation requires validation. Thus, according to an embodiment, validation of whether tier-specific operations are permissible is handled by adding reactive measures such as alerts, monitoring, audit trails, etc., rather than relying on validating allowed operations.

Furthermore, in GUI 620, a current authentication tier indication 614 shows that client 212 is authenticated to the third authentication tier. Indication 614 is a non-limiting example of an authentication tier display. A downgrade control 604 is available for activation (such as a mouse click on a GUI button), whereby downgrading of the authentication tier associated with the current client session may be requested. Further, an upgrade control 602 is also included in example GUI 620, whereby upgrading of the authentication tier associated with the current client session may be requested. However, upgrade control 602 is deactivated in GUI 620 given that there is no higher authentication level to which client 212 may authenticate while the current client session is associated with the third authentication tier. According to an embodiment, a user interface allows requests to upgrade or downgrade by multiple authentication tiers.

Returning to the example given above in connection with step 508 of flowchart 500, client 212 currently displays, at a display device, GUI 620. Downgrade control 604 is activated via client 212, which constitutes an explicit request to downgrade the authentication tier associated with the current client session.

As another example, client 212 satisfies a downgrade criterion based on passage of a pre-defined amount of time during which client 212 is active in application 100, but the activity is associated with authentication tiers that are lower-security than the authentication tier associated with the current client session. For example, according to an embodiment, auth service 120 maintains, in dataset 122, historical request data that records information for requests made by particular clients. In the historical request data, each record includes, at least, a timestamp indicating when the request was received, a session identifier associated with the request, and an authentication tier associated with the request. While the current client session for client 212 is associated with the third authentication tier and based on the historical request data, auth service 120 determines that, over a pre-determined past amount of time (e.g., five minutes), all activity associated with the current client session for client 212 is associated with the second authentication tier or lower. Based on this determination, auth service 120 determines that the current client session satisfies a downgrade criterion.

As another example, client 212 satisfies a downgrade criterion based on passage of a pre-defined amount of time during which client 212 does not request restricted actions for application 100. For example, while the current client session for client 212 is associated with the third authentication tier and based on the historical request data, auth service 120 determines that, over a pre-determined past amount of time (e.g., two minutes), no requests are received at auth service 120 from client 212. Based on this determination, auth service 120 determines that the current client session satisfies a downgrade criterion.

As yet another example, client 212 satisfies a downgrade criterion based on passage of a pre-defined amount of time during which client 212 is not active in application 100. To illustrate, server device 220 runs a listener service 222, which tracks user interactions with application 100. More specifically, listener service 222 records, in historical interaction data, user interface interactions with application 100, including clicks, taps, scrolls, mouse-overs, and keystrokes, etc., registered for application 100 user interfaces. To illustrate, while the current client session for client 212 is associated with the third authentication tier, auth service 120 determines that, based on historical interaction data, no interactions with interfaces of application 100 have been performed at client 212 over a pre-determined past amount of time (e.g., one minute). Based on this determination, auth service 120 determines that the current client session satisfies a downgrade criterion.

As yet another example, client 212 satisfies a downgrade criterion based on passage of a pre-defined amount of time during which no activity is detected at client device 210. To illustrate, client device 210 runs a client-based listener service (not depicted in FIG. 2), which tracks activity at client device 210. According to an embodiment, the client-based listener service sends a warning message, to application 100, if the client-based listener service does not detect activity at client device 210 (e.g., including mouse movements, mouse clicks, keystrokes, etc.) for a predefined amount of time (e.g., two minutes). Based on receiving a warning message from the client-based listener service at client device 210, auth service 120 determines that the current client session for client 212 satisfies a downgrade criterion. Downgrading the client session based on device inactivity protects user information, available via application 100, while the device is idle and potentially unattended.

Action-Specific Authentication Tier Downgrade/Upgrade

According to an embodiment, data field-specific actions are associated with authentication tiers, e.g., in the AASD registry or other mapping data, by associating the data fields themselves, in the registry, with authentication tiers. For example, auth service, or other related system, maintains mapping data that maps authentication tiers to PII data fields. Types of data fields include, for example, FULL_SSN, FULL_FNAME, FULL_LNAME, EMAIL, LAST4_SSN, LAST3_ACCT_NUM, LAST4_PHONE_NUM, FIRST3_EMAIL, etc.

To illustrate, the second authentication tier is associated, in the mapping data, with the data field LAST4_SSN, and the third authentication tier is associated, in the mapping data, with the data field FULL_SSN. When the current client session is associated with the second authentication tier, a GUI displayed at the client includes a masked version of the SSN that displays only the last four digits of the number, based on the mapping of the second authentication tier to LAST4_SSN. When a request to unmask the SSN is received, such action triggers a request to upgrade to the third authentication tier, as described herein.

In connection with upgrading the client session to the third authentication tier, auth service 120 validates the current session and current tier, and returns a response to caller (web server) with information indicating one or more AAS required for the client session to authenticate to the third authentication tier, e.g., the status indicator described in detail herein.

Upon receiving response (with the information indicating the required one or more AAS) from auth service 120, the web server redirects the client to auth UI server 130 with data that was received from auth service 120. In response to the redirection, auth UI server 130 validates the current client session and associated authentication tier. Based on the received information, including the MFA PENDING status, auth UI server 130 serves an MFA challenge page to the client. When the correct OTP code is submitted via the MFA challenge page, auth UI server 130 sends the OTP code validation request to auth service 120. In response, auth service 120 validates the received OTP code and, based on the satisfied AAS, updates the current client session to be associated with the third authentication tier. Auth service 120 returns an authentication successful response to auth UI server 130.

Auth UI server 130 redirects the client to the original destination, which is the page that the user was on from beginning of this operation by which the request to display the full SSN was requested. At this point, the page displays the full SSN based on the client session being associated with at least the authentication tier associated with FULL_SSN in the mapping data.

Determining the Target Downgrade Authentication Tier

Returning to flowchart 500, at step 510, in response to detecting that the session satisfies the one or more downgrade criteria, the authentication-tier data is updated to associate the particular session identifier with the lower-security authentication tier. For example, in the context of tiered authentication implemented by embedding an authentication tier for a current client session in the session identifier, the session identifier for a current client session indicates that the session is associated with the third authentication tier. While the client session is at the third authentication tier, there is an explicit request to downgrade the client session to the first authentication tier. This explicit request indicates that the target authentication tier is the first authentication tier.

In this embodiment, auth service 120 determines that the client session is valid at the third authentication tier and generates a new session identifier for the client session that embeds the first authentication tier. Auth service 120 returns the new session identifier to the caller web server in a successful downgrade response message, and the web server causes the new session identifier to be stored for the client. According to an embodiment, upon receiving the successful downgrade response message, the web server causes the client to display an indication, on the user interface, that the session downgrade was successful.

As another example, in the context of an implementation illustrated by flowchart 400, in response to determining that the client session associated with SS1 satisfies one or more downgrade criteria, auth service 120 automatically associates SS1, in dataset 122, with a target authentication tier. This target authentication tier for the session downgrade is one or more steps below the authentication tier associated with the client session at the time of session downgrade (referred to herein as the "pre-change" authentication tier).

According to an embodiment, auth service 120 identifies the target authentication tier, for a given session downgrade, to be a pre-defined number of authentication tiers (e.g., one authentication tier) below the pre-change authentication tier. In this way, if a client session continues to satisfy downgrade criteria over time (such as because the client device is left idle for a significant amount of time while the client is logged into the application, or because, after performing a high-tier restricted action, the user becomes interested in first-tier content for a significant amount of time) authentication tiers are stepped-down the hierarchy by the set amount. According to an embodiment, the pre-defined amount of time used to determine whether a session satisfies downgrade criteria is shortened at each sequential stepping down of session tier. For example, while the client device is idle, the first amount of time that triggers session downgrade is three minutes, the second amount of time that triggers session downgrade is two minutes, etc.

Stepping down the authentication tier hierarchy, rather than the client session being downgraded to the lowest authentication tier or a relatively low authentication tier all at once, extends the authentication-based rights of the client while protecting sensitive information and actions available at higher authentication tiers. This gradual downgrading can reduce the frustration a user might feel at being downgraded unintentionally, i.e., while the user planned to continue acting at a higher authentication tier.

According to an embodiment, auth service 120 identifies the target authentication tier, for a given session downgrade, based on information for the downgraded session at the time that the client session satisfies the downgrade criteria. For example, at the time of session downgrade, historical request data for client 212 indicates that over a threshold percentage of requests (which could be up to all requests) from client 212, during a pre-defined amount of past time, were associated with a "focus" authentication tier, or were associated with an authentication tier that is at or below a focus authentication tier. If the focus authentication tier is lower than the pre-change authentication tier, then auth service 120 automatically identifies the focus authentication tier to be the target authentication tier for the session downgrade. In this embodiment, if the focus authentication tier is the pre-change authentication tier, then auth service 120 automatically identifies the next lower-security authentication tier, from the pre-change authentication tier, to be the target authentication tier for the downgrade.

According to an embodiment, auth service 120 identifies the target authentication tier, for a given session downgrade, based on the type of downgrade criteria that is satisfied by the client session. For example, when the downgrade criteria that is satisfied by the client session is based on client device inactivity, auth service 120 identifies the target authentication tier, for the session downgrade, to be the first authentication tier or a public tier. As another example, when the downgrade criteria that is satisfied by the client session is based on a lack of requests for the client recorded in historical request data, auth service 120 identifies the target authentication tier, for the session downgrade, to be the first authentication tier.

According to an embodiment, an explicit request to downgrade the client session targets a user-identified authentication tier, which is one or more tiers below the current authentication tier of the client session. For example, in response to detecting activation of downgrade control 604, application 100 automatically displays a pop up window that requests input regarding the target authentication tier for the downgrade request. When a target authentication tier is selected through the pop up window, application 100 automatically downgrades the current client session to the indicated target authentication tier.

Tier Transitions

According to one or more embodiments, the effect of downgrading the authentication tier on the client depends on the state of client 212 at the time of session downgrade. For example, at the time of session downgrade, client 212 displays GUI 620 of FIG. 6C. According to an embodiment, when the client session is downgraded to the second authentication tier from the third authentication tier, application 100 automatically routes client 212 to a default page associated with the second authentication tier.

According to another embodiment, when the client session is downgraded to the second authentication tier from the third authentication tier, the GUI of the currently-displayed page (e.g., page 254) is adjusted based on the post-downgrade authentication tier. In the example of GUI 620, when the client session is downgraded to the second authentication tier, authentication tier indication 614 displayed in GUI 620, which shows the current session authentication as the third authentication tier before the session is downgraded, is updated to reflect the downgraded authentication tier, as shown in GUI 600 of FIG. 6A. Also, upgrade control 602 is activated in GUI 600 to allow explicit upgrading of the current authentication tier for the client session. Furthermore, as shown in GUI 600, application 100 redacts, from the currently-viewed page, information associated with the third authentication tier such that only information associated with the second authentication tier (or lower) is displayed in GUI 600.

As a further example, client 212 displays a user interface with information that is associated with the first authentication tier when the client session is downgraded to the first authentication tier. In this example, there is no change to the displayed user interface, other than to any indication of the current session authentication tier, as described above.

Timing

According to one or more embodiments, application 100 associates each authentication tier, of the plurality of authentication tiers, with a respective timeout period, e.g., in dataset 122. A timeout period is a tier-specific amount of time on which used to determine whether a session, associated with a given authentication tier, satisfies downgrade criteria. To illustrate, for client 212, the first authentication tier is associated with a 30 minute timeout period, the second authentication tier is associated with a 15 minute timeout period, and the third authentication tier is associated with a 5 minute timeout period.

According to an embodiment, at the time that a client session is associated with a particular authentication tier by auth service 120, auth service 120 also sets a downgrade timer with the timeout period for the particular authentication tier. The downgrade timer measures the pre-determined amount of time that is used to determine whether a client session satisfies downgrade criteria, as described above.

According to an embodiment, when a client session changes authentication tier (via either downgrade or upgrade), the downgrade timer is reset with the timeout period of the new authentication tier. Such timer reset is performed whether the authentication tier is changed based on the timer tolling (i.e., the full timeout period has passed since the client session was associated with the pre-change authentication tier), or based on an explicit request, etc.

Figure 7:
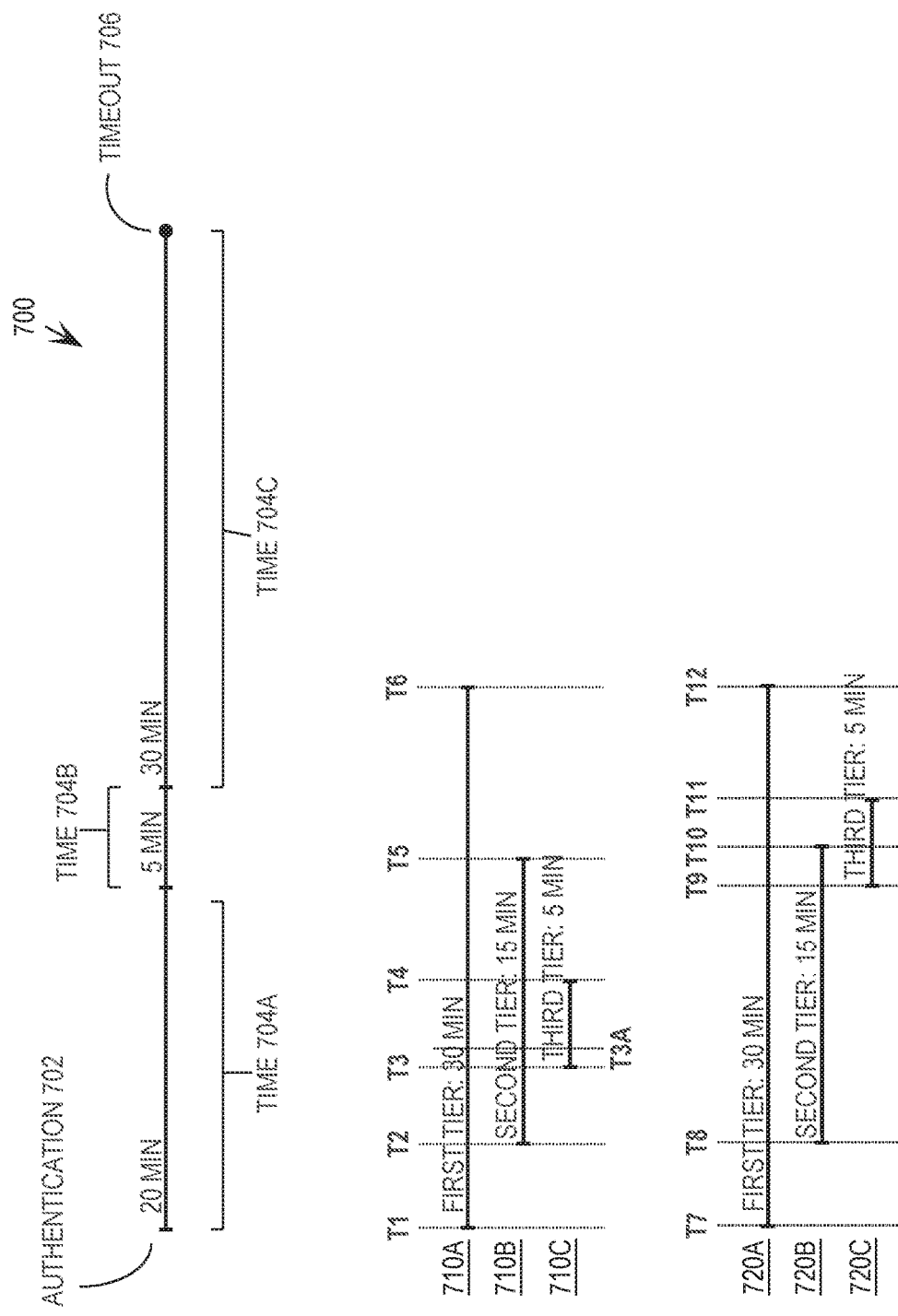
FIG. 7 depicts timelines for timeout periods associated with authentication tiers.

In this embodiment, there is effectively a single downgrade timer by which downgrades are determined, as illustrated by timeline 700 of FIG. 7. In the example of timeline 700, client 212 is authenticated to the first authentication tier at authentication event 702, at which point a downgrade timer is initialized with 30 minutes according to the timeout period of the first authentication tier. After 20 minutes (time period 704A), client 212 is authenticated to the second authentication tier, at which point the downgrade timer is re-initialized with 15 minutes according to the timeout period of the second authentication tier. After five more minutes (time period 704B), the client session associated with client 212 is downgraded to the first authentication tier based on an explicit downgrade request. Upon the client session being associated with the first authentication tier, the downgrade timer is re-initialized with 30 minutes according to the timeout period of the first authentication tier. After 30 minutes at the first authentication tier without a session downgrade for client 212 (time period 704C), the client session is automatically downgraded to a public tier, as depicted by timeout event 708.

According to an embodiment, an extending event extends the amount of time left on the downgrade timer. Example extending events include requests that are associated with the current authentication tier for the client session, or an explicit request to extend the amount of time left on the downgrade timer. According to an embodiment, events that qualify as extending events are authentication tier-specific, and/or the amount of time by which the downgrade timer is extended is authentication tier-specific. For example, an extending event for the first authentication tier extends the time left on the downgrade timer by 5 minutes, an extending event for the second authentication tier extends the time left on the downgrade timer by 2 minutes, and an extending event for the third authentication tier extends the time left on the downgrade timer by 1 minute.

According to another embodiment, multiple tier-specific downgrade timers independently track the pre-determined amounts of time that are used to determine whether a given client session satisfies downgrade criteria. For example, FIG. 7 depicts a set of tier-specific timers 710A-710C through times T1-T6. Specifically, at time T1, client 212 authenticates to the first authentication tier and, accordingly, a first authentication tier-specific timer 710A is initialized to 30 minutes based on the timeout period associated with the first authentication tier. After five minutes, at time T2, client 212 authenticates to the second authentication tier and, accordingly, a second authentication tier-specific timer 710B is initialized to 15 minutes based on the timeout period associated with the second authentication tier. At T2, there are 25 minutes left on timer 710A. While client 212 is authenticated to the second authentication tier, both timer 710A and timer 710B continue running.

At time T3, after five minutes of being authenticated to the second authentication tier, client 212 is authenticated to the third authentication tier and, accordingly, a third authentication tier-specific timer 710C is initialized to 5 minutes based on the timeout period associated with the third authentication tier. While client 212 is authenticated to the third authentication tier, all of timers 701A-710C continue running. After five minutes at the third authentication tier, at time T4, the client session for client 212 satisfies a downgrade criterion based on timer 710C tolling. Furthermore, at time T4, timer 710B has not yet tolled, which means that the second-tier authentication has not yet expired. Because the second-tier authentication for client 212 has not yet expired, the client session for client 212 is downgraded to the second authentication tier.

In the absence of any extending events, at time T5 (which is 15 minutes from time T2), the client session for client 212 is downgraded to the first authentication tier based on timer 710B tolling. Further, at time T6 (which is 30 minutes from time T1), the client session for client 212 is downgraded to the public tier based on timer 710A tolling.

As depicted by a second set of tier-specific timers 720A-720C, client 212 authenticates to the first authentication tier at time T7, and then to the second authentication tier at time T8 that is five minutes after time T7, with respective timers 720A and 720B being initialized in a manner similar to timers 710A and 710B described above. At time T9, which is 13 minutes after time T8, client 212 is authenticated to the third authentication tier. In the absence of any extending events, at time T9, timer 720A has 12 minutes until tolling, and timer 720B has 2 minutes until tolling.

After two minutes at the third authentication tier, at time T10, timer 720B tolls, which does not qualify the client session for downgrade because it is not associated with the current authentication tier of the client session. At time T10, timer 720C has three minutes before tolling, and timer 720A has 10 minutes before tolling. At time T11, which is five minutes after time T9, the client session satisfies a downgrade criterion based on timer 720C tolling given that timer 720C is the timer that is associated with the pre-change authentication tier of the client session. In this case, because the second-tier authentication timer tolled before the third-tier authentication timer, the client session is downgraded to the first authentication tier, which still has remaining time before the associated timer tolls.

According to an embodiment, when a user explicitly downgrades before the time for the higher-security authentication tier expires, the timer for the higher-security authentication tier continues without being cleared. In this way, if the client requests re-authentication with the higher-security tier before the associated timer tolls, the client session is re-associated with the higher-security authentication tier without performing the AAS associated with the higher authentication tier based on the previous authentication (a "non-AAS upgrade").

To illustrate in the context of the series of timers 710A-710C, after a minute of being at the third authentication tier, at time T3A, the client session is explicitly downgraded to the first authentication tier. At the time of downgrading, there are four minutes remaining on timer 710C, nine minutes remaining on timer 710B, and 19 minutes remaining on timer 710C. Any time in the next four minutes (before time T4), the session may be re-associated with the third authentication tier without performing the AAS associated with the third authentication tier. Furthermore, any time in the next nine minutes (before time T5), the session may be re-associated with the second authentication tier without performing the AAS associated with the second authentication tier. For example, an event that instigates re-association of a session with a higher-security authentication tier is any event that would trigger authentication to the tier had the session not been eligible for a non-AAS upgrade.

According to an embodiment, when application 100 automatically downgrades a client session based on client device inactivity, any timers associated with higher-level authentication tiers are cleared such that the AAS associated with the higher tiers must be satisfied in order to return the session to the higher authentication tiers.

Upgrading the Session after Downgrading

According to an embodiment, a client session that is downgraded based on inactivity at the higher-security authentication tier is required to perform any AAS associated with higher-security tiers when the client requests a restricted action associated with the higher-security tiers. Such a restricted action may be a request to view a page that is associated with the higher-security authentication tier, a request to view redacted information (a higher-security request) in a page that is associated with the lower-security authentication tier, or a request to edit information (a higher-security request) in a page that is associated with the lower-security authentication tier, etc.

According to an embodiment, a request to upgrade the session authentication tier is performed without changing the currently-viewed page or the content thereon. For example, page 244 (a 1TP) includes a control, activation of which constitutes a request to upgrade the authentication tier associated with the current client session, such as upgrade control 602 of GUI 600 (FIG. 6). A user at client 212 activates the upgrade control, thereby sending a request to upgrade the current client session from a first-tier authentication to a third-tier authentication. In this example, the AAS associated with the requested authentication tier (but not the AAS associated with intervening tiers) is completed in order to authenticate to the third authentication tier. Upon receiving this request, auth service 120 causes auth challenge page 134B with an MFA challenge (associated with the third authentication tier) to be displayed, e.g., as a pop-up over page 244. Once the MFA challenge is successfully completed, auth service 120 associates the client session with the third authentication tier and clears the pop-up, revealing page 244. According to an embodiment in which the authentication tier of the current client session is displayed on page 244, the only change to page 244 is to the current authentication indication, which is changed to show that the client session is now authenticated to the third authentication tier.

According to another embodiment, in response to upgrading the session authentication tier, previously-redacted information is displayed in the currently-viewed page. For example, while a current client session is at a second authentication tier, client 212 displays page 246, which is a 2TP as shown in GUI 600 of FIG. 6A. As indicated above, GUI 600 includes some PII that is accessible at the second authentication tier, i.e., the account nickname, the last three digits of the account number (the rest of which is redacted as the full account number is associated with the third authentication tier), the account email address, and physical address. Furthermore, GUI 600 includes the following controls, activation of which requests restricted actions associated with the third authentication tier: display control 608 for displaying the full account number 606, an edit control 610 for editing the email address, and an edit control 612 for editing the physical address.

Through GUI 600, there are multiple paths to the third authentication tier, including activation of upgrade control 602, as discussed above, or activation of any of controls 608, 610, and 612. In this example, upon detecting activation of any of controls 608, 610, or 612, auth service 120 causes MFA challenge page 134B to be displayed in a pop-up window, such as is depicted in FIG. 6B. Once client 212 is authenticated to the third authentication tier, as described in detail above, the pop-up window is cleared and page 246 is displayed with third-tier information shown, as in GUI 620 of FIG. 6C. Current authentication tier indication 614 shows that the client is authenticated to the third authentication tier. Furthermore, account number 606 is fully displayed. If, while the client is associated with the third authentication tier, either of edit controls 610 or 612 are activated, the client is permitted to perform the associated restricted action without further authentication steps being required.

Lower Authentication Level Emulation

According to an embodiment, application 100 is configured to emulate a lower-security authentication tier while the client session is associated with a higher-security authentication tier. Such lower-tier emulation is useful when a user wishes to show a user interface of application 100 to another person, but does not wish the other person to see or have access to the user's PII. For example, a client session being used by a businessperson is authenticated to an authentication tier that allows viewing of sensitive information, including multiple options for sales packages that the businessperson is authorized to offer a customer. The businessperson wishes to show the display to the customer, but does not wish the customer to see all of the sensitive information, including offers that would provide a lower commission to the businessperson. In this case, the businessperson causes application 100 to emulate a lower authentication tier, which hides the sensitive information, which emulation does not require re-execution of the authentication steps associated with the higher authentication tier upon the businessperson returning their screen to their exclusive view.

For example, emulation of the lower-security authentication tier causes the client to be redirected to a similar page that is associated with the lower-security authentication tier. As another example, emulation of the lower-security authentication tier causes higher-tier information to be redacted (or removed completely) from the GUI. Thus, authentication tier emulation saves time and frustration for the user. According to an embodiment, web servers implementing application 100 use a common module or common library that handles authentication tier-specific look and feel versions for web pages, which makes for efficient page development. For example, a common library provides a convenient and organized look and feel for each web page of application 100, which are authentication tier-specific. This library provides the information needed to mask information that is associated with a higher-security authentication tier when emulating a lower-security authentication tier.

Horizontal Tiers

According to an embodiment, authentication tiers are not strictly hierarchical in that information that is accessible across the tiers may be mutually exclusive. For example, on a client device that may be used by multiple different people within a company, each authentication tier represents a role in the company. In the case of horizontal tiers, a particular tier is configured to be the default authentication tier, which is treated as the lowest authentication tier. All other horizontal authentication tiers are treated as second-level authentication tiers. In accordance with techniques described above, a session that is at a second-level (horizontal) authentication tier is downgraded to the default authentication tier when the session satisfies the one or more downgrade criteria.

According to another embodiment, horizontal roles may be entered into for one or more authentication tiers of the plurality of hierarchical authentication tiers. These horizontal roles may also be organized in a separate hierarchy. To illustrate, a cashier is logged into a given machine as "cashier" role with a second-tier authentication. The cashier needs to perform an operation that is available only when in a "manager" role that is hierarchically higher than the "cashier" role. A manager comes and requests upgrading the role of the current client session to "manager". As a condition of the upgrade operation, the manager solves one or more required authentication challenges, which includes providing a manager's username and password and/or scanning a managerial badge. After solving the one or more required authentication challenges, the current client session on the given machine is upgraded to a "manager" role with a second-tier authentication (based on the previous second-tier authentication while in the "cashier" role). While the client session is authenticated to the "manager" role, the manager performs one or more operations that are not allowed in "cashier" role at the second authentication tier. After performing the one or more operations, the manager explicitly downgrades the current client session back to the "cashier" role at the second authentication tier, and hands control of the machine back to the cashier.

Defining role-based horizontal tiers aids in tracking actions that were performed on a given client. For example, all actions performed while a session is at a particular horizontal authentication tier are logged to a log record that is specific to the particular horizontal tier. As such, log records are stored in association with the "roles" represented by the horizontal tiers rather than in a single composite log. Such logs are less expensive to audit than composite logs.

Network Architecture Overview

FIG. 2 is a block diagram that depicts an example network arrangement 200 implementing application 100, according to embodiments. Network arrangement 200 includes a client device 210 and a server devices 220, 240, and 250 communicatively coupled via a network 230. Example network arrangement 200 may include other devices, including client devices, server devices, and display devices, according to embodiments.

Client device 210 may be implemented by any type of computing device that is communicatively connected to network 230. Example implementations of client device 210 include, without limitation, workstations, personal computers, laptop computers, personal digital assistants (PDAs), tablet computers, cellular telephony devices such as smart phones, and any other type of computing device.

In network arrangement 200, client device 210 is configured with a client 212. Client 212 may be implemented in any number of ways, including as a stand-alone application running on client device 210, as a plugin to a browser running at client device 210, etc. Client 212 may be implemented by one or more logical modules. Client device 210 may be configured with other mechanisms, processes and functionalities, depending upon a particular implementation.

Network 230 may be implemented with any type of medium and/or mechanism that facilitates the exchange of information between client device 210 and server device 220. Furthermore, network 230 may facilitate use of any type of communications protocol, and may be secured or unsecured, depending upon the requirements of a particular embodiment.

Server devices 220, 240, and 250 may be implemented by any type of computing device that is capable of communicating with other devices over network 230. In network arrangement 200, server device 220 is configured with a plurality of services, including account service 110, authentication service 120, auth UI server 130, and listener service 222. FIG. 2 depicts these services running independently, but any of them may be implemented jointly, according to implementation. Server device 220 may run one or more other services/processes, including a web server serving pages stored at server device 220 or stored at memory that is accessible by server device 220. Any of the functionality attributed to particular services/processes herein may be performed by another entity running on any of client device 210, server devices 220, 240, or 250, or on other devices that are communicatively coupled to network 230, according to embodiments. Server devices 220, 240, and 250 may be configured with other mechanisms, hardware, processes, and functionalities, depending upon a particular implementation.

Any of authentication dataset 122, login page 132, and/or authentication challenge page(s) 134A-N may be stored in persistent memory that is internal or external to server device 220. For example, server device 220 is communicatively coupled to a database that maintains the indicated information. The database may reside in any type of storage, including volatile and non-volatile storage (e.g., random access memory (RAM), a removable or disk drive, main memory, etc.), and may be implemented by one or more logical databases. The storage on which the database resides may be external or internal to server device 220.

Furthermore, in the example network arrangement 200 of FIG. 2, server devices 240 and 250 run respective web servers 242 and 252, each of which serves one or more pages for application 100. Pages being served by web servers 242 and 252 are depicted as being stored at the respective server devices (or in storage that is controlled by the respective server devices), but one or more of the pages may be stored by a different server device and served by the respective web server, depending on implementation. The web pages served by server devices 240 and 250 may or may not be within the same domain private/virtual private network as pages served by server device 220, according to implementation. When a web server serves pages that are outside of the private network of pages served by server device 220, the web server shares security credentials with auth service 120 in any way, including implementing single sign-on (SSO), using security markup language (SAML), signing part of a message, or in any other way. According to an embodiment, CSRF (cross-site reference forgery) is prevented using best security mechanism when dealing with cross-domain services.

One or more of the functions attributed to any service/process described herein, may be performed any other logical entity that may or may not be depicted in FIG. 2, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

An application or service is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function on behalf of one or more clients.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
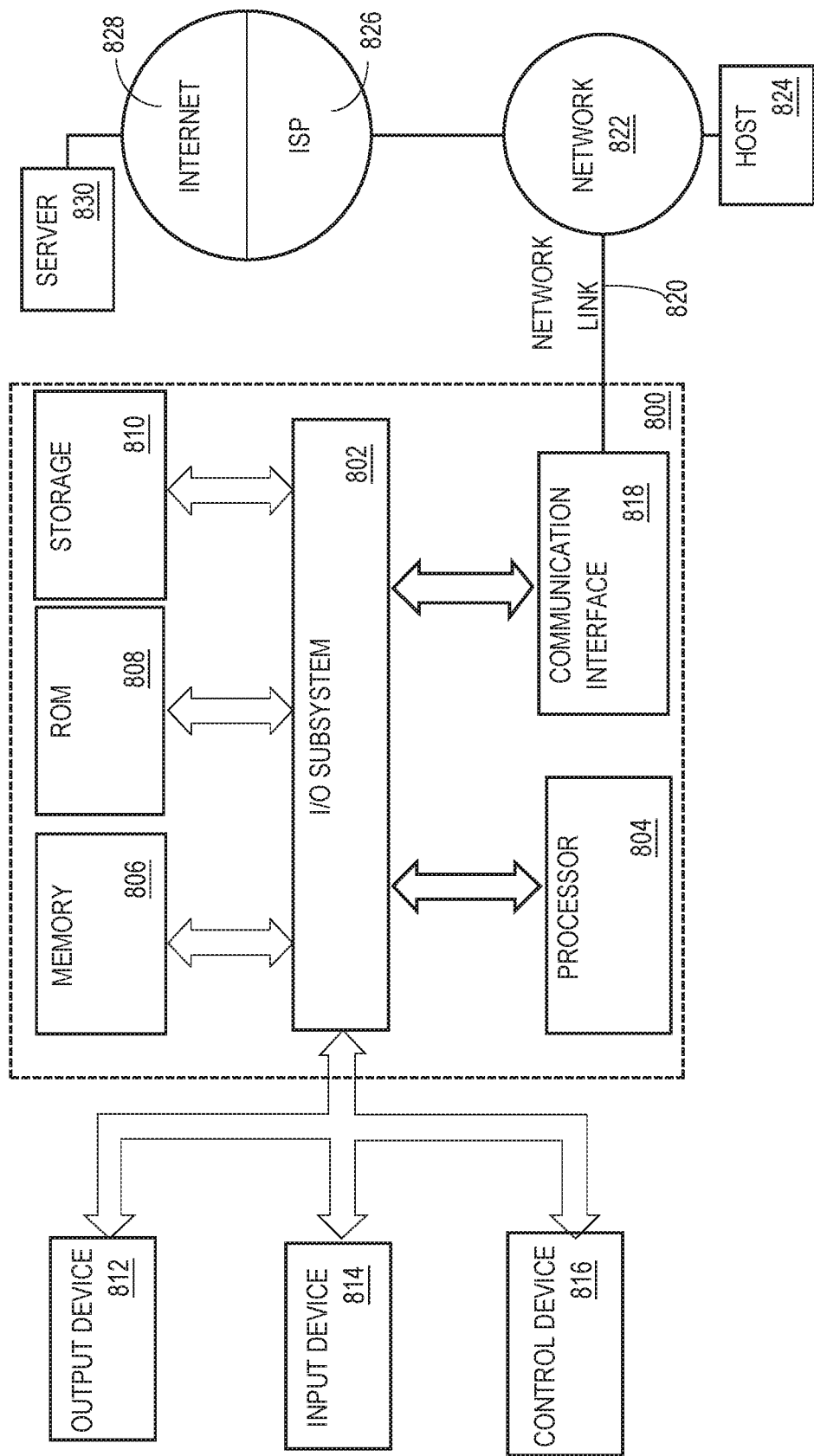
FIG. 8 is a block diagram of a computer system on which embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
generating a particular session identifier for a session of a client of an application;
wherein the application supports a plurality of authentication tiers;
wherein each authentication tier, of the plurality of authentication tiers, is associated with one or more respective authentication steps of a plurality of authentication steps;
wherein the plurality of authentication tiers includes (a) a higher-security authentication tier that allows first one or more restricted actions, and (b) a lower-security authentication tier that allows second one or more restricted actions;
authenticating the client to the higher-security authentication tier;
based on said authenticating the client to the higher-security authentication tier, maintaining authentication-tier data that identifies an authentication tier for the session by associating the particular session identifier with the higher-security authentication tier;
responsive to said authenticating the client to the higher-security authentication tier, setting a downgrade timer with a pre-defined timeout period of time;
after setting the downgrade timer, detecting, in the session, an extending event comprising one of:
one or more restricted actions of the first one or more restricted actions, or
a user request to extend an amount of time left on the downgrade timer;
responsive to detecting the extending event, extending the amount of time left on the downgrade timer;
detecting that the downgrade timer has expired;
in response to detecting that the downgrade timer has expired, downgrading the authentication tier of the session by updating the authentication-tier data to associate the particular session identifier with the lower-security authentication tier;
wherein the method is performed by one or more computing devices.

2. The computer-executed method of claim 1, further comprising:
after detecting that the downgrade timer has expired, receiving a request associated with the particular session identifier to perform a particular action that is associated with the higher-security authentication tier;
in response to receiving the request:
based, at least in part, on (a) the particular session identifier being associated with the lower-security authentication tier and (b) the particular action being associated with the higher-security authentication tier, providing, to the client, an authentication challenge associated with the higher-security authentication tier,
based on user input to the authentication challenge via the client, authenticating the client to the higher-security authentication tier,
updating the authentication-tier data to associate the particular session identifier with the higher-security authentication tier, and
as a response to the request, causing performance of the particular action based, at least in part, on the particular session identifier being associated with the higher-security authentication tier.

3. The computer-executed method of claim 2, wherein the particular action is one of:
view a page that is associated with the higher-security authentication tier;
view redacted information in a page that is associated with the lower-security authentication tier; or
edit information in a page that is associated with the lower-security authentication tier.

4. The computer-executed method of claim 1, further comprising:
while the particular session identifier is associated with the lower-security authentication tier, receiving a request associated with the particular session identifier to upgrade the authentication tier that is associated with the particular session identifier to a particular authentication tier of the plurality of authentication tiers;
wherein the particular authentication tier is higher than the lower-security authentication tier; and
in response to receiving the request:
providing, to the client, an authentication challenge associated with the particular authentication tier,
based on user input to the authentication challenge via the client, authenticating the client to the particular authentication tier, and updating the authentication-tier data to associate the particular session identifier with the particular authentication tier.

5. The computer-executed method of claim 4, further comprising:
while the particular session identifier is associated with the lower-security authentication tier, serving, to the client, a particular page, of the application, that is associated with the lower-security authentication tier;
wherein the particular page includes redacted information that is associated with the particular authentication tier;
wherein, while the particular session identifier is associated with the lower-security authentication tier, the client does not have access to the redacted information; and
based, at least in part, on (a) the particular session identifier being associated with the particular authentication tier and (b) the redacted information being associated with the particular authentication tier, providing the client access to the redacted information.

6. The computer-executed method of claim 1, further comprising displaying, in a page of the application, information identifying the authentication tier associated with the particular session identifier.

7. The computer-executed method of claim 1, wherein the extending event comprises one or more restricted actions of the first one or more restricted actions.

8. The computer-executed method of claim 7, wherein:
the downgrade timer is a first downgrade timer;
the pre-defined timeout period of time is a first timeout period associated with the higher-security authentication tier; and
the method further comprises:
prior to authenticating the client to the higher-security authentication tier, authenticating the client to the lower-security authentication tier;
based on authenticating the client to the lower-security authentication tier, setting a second downgrade timer based on a second timeout period of time associated with the lower-security authentication tier;
wherein said authenticating the client to the higher-security authentication tier is performed prior to expiration of the second downgrade timer.

9. The computer-executed method of claim 8, further comprising:
based on said downgrading the authentication tier of the session, setting a third timer based on the second timeout period associated with the lower-security authentication tier.

10. The computer-executed method of claim 1, further comprising:
authenticating a particular client associated with a second client session to the lower-security authentication tier;
based on authenticating the client to the lower-security authentication tier, setting a second downgrade timer based on a particular pre-defined amount of time associated with the lower-security authentication tier; and
in response to detecting expiration of the second downgrade timer, logging the particular client out of the application.

11. A computer-executed method comprising:
generating a particular session identifier for a session of a client of an application;
wherein the application supports a plurality of authentication tiers;
wherein each authentication tier, of the plurality of authentication tiers, is associated with one or more respective authentication steps of a plurality of authentication steps;
wherein the plurality of authentication tiers includes (a) a higher-security authentication tier that allows first one or more restricted actions, and (b) a lower-security authentication tier that allows second one or more restricted actions;
authenticating the client to the higher-security authentication tier;
based on said authenticating the client to the higher-security authentication tier:
maintaining authentication-tier data that identifies an authentication tier for the session by associating the particular session identifier with the higher-security authentication tier, and
setting a timer based on a particular pre-defined amount of time associated with the higher-security authentication tier;
detecting a particular explicit user request to downgrade the authentication tier associated with the particular session identifier;
wherein the particular explicit user request is received prior to expiration of the timer;
in response to detecting the particular explicit user request to downgrade the authentication tier associated with the particular session identifier, downgrading the authentication tier of the session by updating the authentication-tier data to associate the particular session identifier with the lower-security authentication tier;
after downgrading the authentication tier of the session and prior to expiration of the timer, receiving an action request from the client to perform a restricted action of the first one or more restricted actions; and
in response to receiving the action request from the client, updating the authentication-tier data to associate the particular session identifier with the higher-security authentication tier without requiring the client to re-execute particular one or more authentication steps associated with the higher-security authentication tier;
wherein the method is performed by one or more computing devices.

12. One or more non-transitory computer-readable media storing one or more sequences of instructions that, when executed by one or more processors, cause:
generating a particular session identifier for a session of a client of an application;
wherein the application supports a plurality of authentication tiers;
wherein each authentication tier, of the plurality of authentication tiers, is associated with one or more respective authentication steps of a plurality of authentication steps;
wherein the plurality of authentication tiers includes (a) a higher-security authentication tier that allows first one or more restricted actions, and (b) a lower-security authentication tier that allows second one or more restricted actions;
authenticating the client to the higher-security authentication tier;
based on said authenticating the client to the higher-security authentication tier:
maintaining authentication-tier data that identifies an authentication tier for the session by associating the particular session identifier with the higher-security authentication tier, and

37 setting a timer based on a particular pre-defined amount of time associated with the higher-security authentication tier;
detecting a particular explicit user request to downgrade the authentication tier associated with the particular session identifier;
wherein the particular explicit user request is received prior to expiration of the timer;
in response to detecting the particular explicit user request to downgrade the authentication tier associated with the particular session identifier, downgrading the authentication tier of the session by updating the authentication-tier data to associate the particular session identifier with the lower-security authentication tier;
after downgrading the authentication tier of the session and prior to expiration of the timer, receiving an action request from the client to perform a restricted action of the first one or more restricted actions; and
in response to receiving the action request from the client, updating the authentication-tier data to associate the particular session identifier with the higher-security authentication tier without requiring the client to re-execute particular one or more authentication steps associated with the higher-security authentication tier.

13. One or more non-transitory computer-readable media storing one or more sequences of instructions that, when executed by one or more processors, cause:
generating a particular session identifier for a session of a client of an application;
wherein the application supports a plurality of authentication tiers;
wherein each authentication tier, of the plurality of authentication tiers, is associated with one or more respective authentication steps of a plurality of authentication steps;
wherein the plurality of authentication tiers includes (a) a higher-security authentication tier that allows first one or more restricted actions, and (b) a lower-security authentication tier that allows second one or more restricted actions;
authenticating the client to the higher-security authentication tier;
based on said authenticating the client to the higher-security authentication tier, maintaining authentication-tier data that identifies an authentication tier for the session by associating the particular session identifier with the higher-security authentication tier;
responsive to said authenticating the client to the higher-security authentication tier, setting a downgrade timer with a pre-defined timeout period of time;
after setting the downgrade timer, detecting, in the session, an extending event comprising one of:
one or more restricted actions of the first one or more restricted actions, or
a user request to extend an amount of time left on the downgrade timer;
responsive to detecting the extending event, extending the amount of time left on the downgrade timer;
detecting that the downgrade timer has expired;
in response to detecting that the downgrade timer has expired, downgrading the authentication tier of the session by updating the authentication-tier data to associate the particular session identifier with the lower-security authentication tier.

14. The one or more non-transitory computer-readable media of claim 13, wherein the one or more sequences of instructions further comprise instructions that, when executed by one or more processors, cause:
after detecting that the downgrade timer has expired, receiving a request associated with the particular session identifier to perform a particular action that is associated with the higher-security authentication tier;
in response to receiving the request:
based, at least in part, on (a) the particular session identifier being associated with the lower-security authentication tier and (b) the particular action being associated with the higher-security authentication tier, providing, to the client, an authentication challenge associated with the higher-security authentication tier,
based on user input to the authentication challenge via the client, authenticating the client to the higher-security authentication tier,
updating the authentication-tier data to associate the particular session identifier with the higher-security authentication tier, and
as a response to the request, causing performance of the particular action based, at least in part, on the particular session identifier being associated with the higher-security authentication tier.

15. The one or more non-transitory computer-readable media of claim 14, wherein the particular action is one of:
view a page that is associated with the higher-security authentication tier;
view redacted information in a page that is associated with the lower-security authentication tier; or
edit information in a page that is associated with the lower-security authentication tier.

16. The one or more non-transitory computer-readable media of claim 13, wherein the one or more sequences of instructions further comprise instructions that, when executed by one or more processors, cause:
while the particular session identifier is associated with the lower-security authentication tier, receiving a request associated with the particular session identifier to upgrade the authentication tier that is associated with the particular session identifier to a particular authentication tier of the plurality of authentication tiers;
wherein the particular authentication tier is higher than the lower-security authentication tier; and
in response to receiving the request:
providing, to the client, an authentication challenge associated with the particular authentication tier,
based on user input to the authentication challenge via the client, authenticating the client to the particular authentication tier, and
updating the authentication-tier data to associate the particular session identifier with the particular authentication tier.

17. The one or more non-transitory computer-readable media of claim 16, wherein the one or more sequences of instructions further comprise instructions that, when executed by one or more processors, cause:
while the particular session identifier is associated with the lower-security authentication tier, serving, to the client, a particular page, of the application, that is associated with the lower-security authentication tier;
wherein the particular page includes redacted information that is associated with the particular authentication tier;
wherein, while the particular session identifier is associated with the lower-security authentication tier, the client does not have access to the redacted information; and based, at least in part, on (a) the particular session identifier being associated with the particular authentication tier and (b) the redacted information being associated with the particular authentication tier, providing the client access to the redacted information.

18. The one or more non-transitory computer-readable media of claim 13, wherein the one or more sequences of instructions further comprise instructions that, when executed by one or more processors, cause displaying, in a page of the application, information identifying the authentication tier associated with the particular session identifier.

19. The one or more non-transitory computer-readable media of claim 13, wherein the extending event comprises one or more restricted actions of the first one or more restricted actions.

20. The one or more non-transitory computer-readable media of claim 19, wherein:
the downgrade timer is a first downgrade timer;
the pre-defined timeout period of time is a first timeout period associated with the higher-security authentication tier; and
the one or more sequences of instructions further comprise instructions that, when executed by one or more processors, cause:
prior to authenticating the client to the higher-security authentication tier, authenticating the client to the lower-security authentication tier;
based on authenticating the client to the lower-security authentication tier, setting a second downgrade timer based on a second timeout period of time associated with the lower-security authentication tier;
wherein said authenticating the client to the higher-security authentication tier is performed prior to expiration of the second downgrade timer.

21. The one or more non-transitory computer-readable media of claim 20, wherein the one or more sequences of instructions further comprise instructions that, when executed by one or more processors, cause:
based on said downgrading the authentication tier of the session, setting a third timer based on the second timeout period associated with the lower-security authentication tier.

22. The one or more non-transitory computer-readable media of claim 13, wherein the one or more sequences of instructions further comprise instructions that, when executed by one or more processors, cause:
authenticating a particular client associated with a second client session to the lower-security authentication tier;
based on authenticating the client to the lower-security authentication tier, setting a second downgrade timer based on a particular pre-defined amount of time associated with the lower-security authentication tier; and
in response to detecting expiration of the second downgrade timer, logging the particular client out of the application.

* * * * *